(12) United States Patent
Lenzner

(10) Patent No.: US 12,453,620 B2
(45) Date of Patent: Oct. 28, 2025

(54) BRACKET

(71) Applicant: SWISSODONT GMBH, Heerbrugg (CH)

(72) Inventor: Benedikt Lenzner, Hildesheim (DE)

(73) Assignee: SWISSODONT GMBH (CH)

( * ) Notice: Subject to any disclaimer, the term of this patent is extended or adjusted under 35 U.S.C. 154(b) by 0 days.

(21) Appl. No.: 18/210,872

(22) Filed: Jun. 16, 2023

(65) Prior Publication Data

US 2023/0329842 A1 Oct. 19, 2023

Related U.S. Application Data

(63) Continuation of application No. 16/767,771, filed as application No. PCT/EP2018/083178 on Nov. 30, 2018, now Pat. No. 11,730,570.

(30) Foreign Application Priority Data

Nov. 30, 2017 (DE) ........................ 10 2017 128418.4

(51) Int. Cl.
*A61C 7/14* (2006.01)
*A61C 7/28* (2006.01)

(52) U.S. Cl.
CPC .............. *A61C 7/143* (2013.01); *A61C 7/141* (2013.01); *A61C 7/28* (2013.01)

(58) Field of Classification Search
CPC ........... A61C 7/14; A61C 7/141; A61C 7/143; A61C 77/148; A61C 7/28
See application file for complete search history.

(56) References Cited

U.S. PATENT DOCUMENTS

| 3,043,007 | A | * | 7/1962 | Wallshein | A61C 7/12 433/20 |
| 3,464,112 | A | * | 9/1969 | Silverman | A61C 7/00 433/11 |
| 7,306,457 | B2 | | 12/2007 | Vigolo | |
| 7,387,512 | B2 | * | 6/2008 | Clor | A61C 7/28 433/10 |
| 10,485,636 | B2 | | 11/2019 | Hung | |

(Continued)

FOREIGN PATENT DOCUMENTS

| CN | 202069706 U | 12/2011 |
| CN | 102525670 A | 7/2012 |

(Continued)

OTHER PUBLICATIONS

International Search Report for Application No. PCT/EP2018/083178, mailed Apr. 24, 2019, pp. 1-6.

(Continued)

*Primary Examiner* — Ralph A Lewis
(74) *Attorney, Agent, or Firm* — Lerner David LLP

(57) ABSTRACT

The invention relates to a bracket for correcting the position of a tooth, comprising a bracket base of a bracket body, which bracket base can be fastened to a tooth, and which bracket body has a slot, extending in the mesiodistal direction, and also a fourth slot portion that narrows by a predetermined amount in a predetermined region, so as preferably to form a snug fit for an inserted archwire, wherein the fourth slot portion is designed running in the longitudinal direction substantially parallel to the bracket base.

18 Claims, 33 Drawing Sheets

(56) References Cited

U.S. PATENT DOCUMENTS

| | | | |
|---|---|---|---|
| 10,779,911 B2* | 9/2020 | Cursio | A61C 7/16 |
| 11,730,570 B2* | 8/2023 | Lenzner | A61C 7/148 |
| | | | 433/10 |
| 2003/0049582 A1 | 3/2003 | Abels et al. | |
| 2006/0246392 A1* | 11/2006 | Vigolo | A61C 7/28 |
| | | | 433/10 |
| 2007/0015103 A1* | 1/2007 | Sorel | A61C 7/145 |
| | | | 433/8 |
| 2007/0166658 A1 | 7/2007 | Voudouris | |
| 2007/0207436 A1* | 9/2007 | Tan | A61C 7/14 |
| | | | 433/10 |
| 2008/0199825 A1* | 8/2008 | Jahn | A61C 7/30 |
| | | | 433/11 |
| 2011/0014583 A1* | 1/2011 | Romano | A61C 7/143 |
| | | | 433/10 |
| 2012/0301838 A1* | 11/2012 | Kabbani | A61C 7/30 |
| | | | 433/11 |
| 2016/0106522 A1* | 4/2016 | Kim | A61C 7/16 |
| | | | 433/9 |
| 2019/0090987 A1* | 3/2019 | Hung | A61C 7/148 |

FOREIGN PATENT DOCUMENTS

| | | |
|---|---|---|
| CN | 202821674 U | 3/2013 |
| DE | 102007008356 B3 | 7/2008 |
| DE | 102010008749 A1 | 8/2011 |
| IN | 205569099 U | 9/2016 |
| KR | 20000037379 A | 7/2000 |
| WO | 2011102994 A1 | 8/2011 |

OTHER PUBLICATIONS

Chinese Search Report for Application No. 201880077491.6 dated Mar. 17, 2021, 2 pages.

Search Report dated Apr. 1, 2022 from Office for Chinese Application No. 201880077491.6 issued Apr. 8, 2022. 2 pages.

* cited by examiner

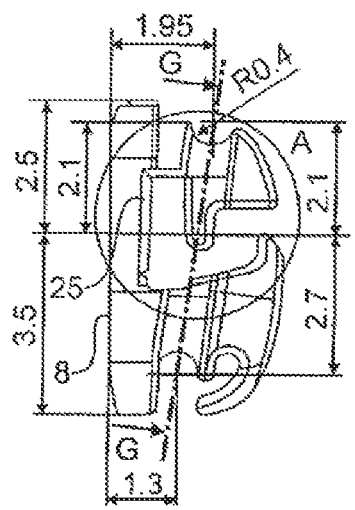
4.9
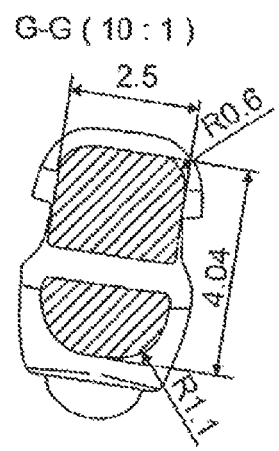
4.10
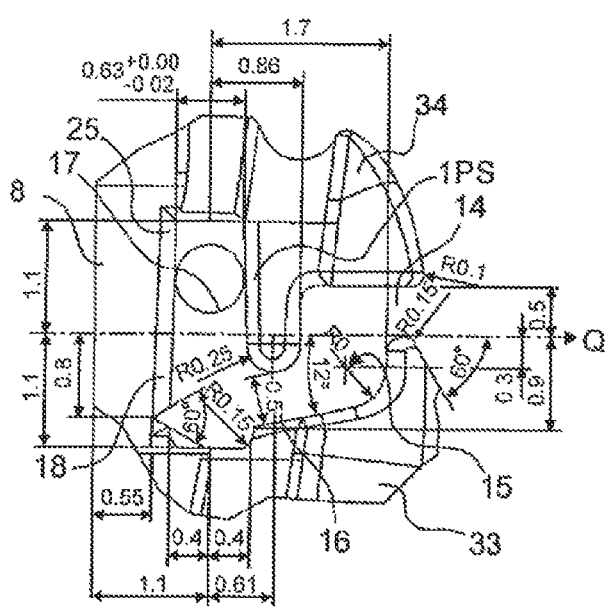
4.11
4.12
Fig. 4

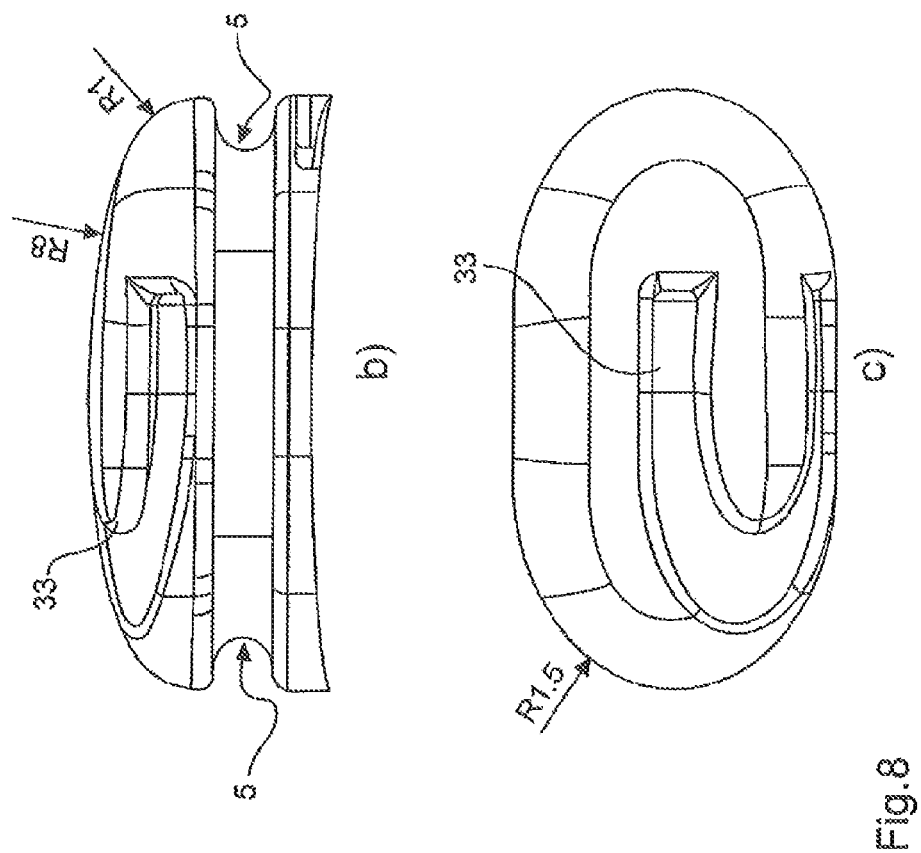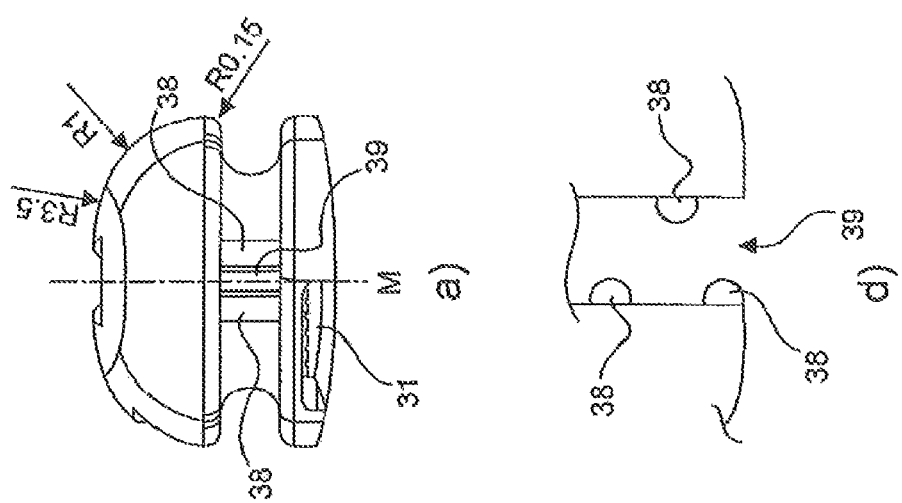
Fig. 8

BRACKET

CROSS-REFERENCE TO RELATED APPLICATIONS

The present application is a continuation of U.S. patent application Ser. No. 16/767,771, filed on May 28, 2020, which is a national phase entry under 35 U.S.C. § 371 of International Application No. PCT/EP2018/083178, filed on Nov. 30, 2018, which claims priority from German Patent Application No. 10-2017-128418.4, filed on Nov. 30, 2017, the disclosures of all of which are hereby incorporated by reference herein.

DESCRIPTION

The invention relates to a bracket for correcting the position of a tooth.

The invention further relates also to a set of brackets, with different sizes and variants of brackets.

Brackets have been known quite generally in orthodontics for some time now, and particular reference is made to the documents cited below which disclose various designs and functionalities.

Brackets are fastening elements commonly used in orthodontics for fixed appliances. Several brackets arranged on different teeth, and connected to an archwire, are also referred to as a brace. Such a brace is a dental appliance with which malpositions of the jaws and teeth are corrected.

A bracket is therefore an individual element of a brace. Brackets have hitherto been bonded (or adhesively connected) to the surface of the tooth by special bonding techniques or an adhesion technique by virtue of the polymerization shrinkage of the plastic and thus form a starting point for the movement of teeth in fixed appliances.

Characteristic of a bracket is the device for receiving an arch (also called archwire), in a so-called lock or slot. This is a slot extending horizontally, i.e. in the mesiodistal direction. This slot is limited upwardly and downwardly by the edges of the wings which serve to fasten the arch with the aid of, for example, ligatures.

The standard bracket has two wings and is therefore referred to as a twin bracket. Occasionally, brackets with one wing are used, and these are referred to as single brackets. According to the shape of the lock, brackets can be produced as edgewise brackets. The edgewise technique is a technique in which the three-dimensional bends are made around the wire; in the straight wire technique, these intended tooth movements in three-dimensional space were programmed as programming (programmed bracket) into the bracket base with values, for example, after Ricketts, Alexander, Roth, Andrews, Bennett, McLaughlin, Trevisi, Light Wire Brackets. In addition, there are self-ligating brackets (a mechanism anchored in the bracket holds in the arch without ligature). Thus, the bracket base plays a dominant role, because it can once be "programmed", i.e. three-dimensionally aligned, and once not. In the latter case, the bends must be made in the wire itself. In the edgewise technique, the wire runs through the straight bracket and is bent by the orthodontist according to the position correction to be moved, while in the straight wire technique these bends are generally not necessary since, as has been mentioned, the optimal tooth movements are pre-programmed in the special form of the bracket base. There are also brackets with a vertical slot.

The lock has a square portion that has either the dimensions (H×D inch)0.018"×0.025" or 0.022"×0.028". In technical language, one speaks of a 018 or 022 system. Both systems are also compatible with each other.

When configuring the various systems in a patient, a 0.18" slot can be used for better torque effect in the region of the anterior teeth, and a 0.22" slot can be used in the region of the posterior teeth for better "sliding".

In addition, brackets can be distinguished according to where they are fastened to the tooth. If they are fastened to the surface directed toward the cheek, the terms used are vestibular or conventional technique or buccal brackets. If they are located on the inner surface directed toward the tongue, they are also referred to as lingual brackets.

As is known, brackets are usually made of stainless steel, although there are also brackets that are made of gold (or gold-plated materials), ceramic, composite or titanium or the like.

An important property regarding the choice of bracket material and arch material is the friction. In many treatment concepts, the bracket should slide better over the arch. Both the material combination of bracket and arch and also the type of ligatures used can increase or decrease the friction.

The brackets are fastened to the tooth by means of, for example, a plastic adhesive technique or other compatible bonding methods on the surface of the tooth, and the brackets thus form a starting point for three-dimensional movements of teeth in fixed fittings.

As arch material it is possible, for example, to use metal, which on average is round or angular or may also have a different diameter.

By the use of brackets and their formation into a brace or the like, i.e. by the connection of several brackets by an archwire, very different tooth movements can be achieved in a patient. These include, for example, rotations about the axis of the tooth, axially correct adjustment of teeth by torque (torsion), straightening of tilted molars, for example the 12-year molars (the second posterior molars) after early loss of the 6-year molars (the first posterior molars), gap closure in adults, gap opening in adults, closed bite treatments, pronounced Spee curve (occlusion curve, running through the chewing contacts of the upper and lower teeth), vertical growth pattern (growth tendency toward an open bite), cross-bite in adults (the buccal cusps, facing toward the cheek, (and) of the upper posterior teeth bite centrally into the masticatory surface relief of the lower posterior teeth rather than laterally past their buccal cusps), buccal nonocclusion/scissor bite in adults (the mandibular posterior tooth bites completely (on the lingual aspect/buccal aspect of the maxillary posterior tooth), forming of the maxillary and mandibular dental arch, etc.

With the invention, the abovementioned physical tooth movements are still to be permitted, and also further movements, and above all this should be made possible by a bracket according to the invention, which is easy to apply and operate by the physician, dentist, orthodontist, etc. Moreover, the bracket should not cause annoyance to the patient, and the bracket should generally reduce the overall treatment time (in the orthodontic practice), and the patient should also have the feeling that the bracket sits securely on the teeth and remains there.

Finally, the object of the invention is also to make it easier for the patient to wear a bracket and in particular to protect the mucous membranes in the region of the inner lip and cheeks and tongue (when used as a lingual bracket) and to reduce or, if possible, completely avoid injuries and associated inflammation.

Moreover, the size of the bracket base serves to reduce tooth decay.

The invention achieves the object by making available a bracket having the feature according to claim 1.

Advantageous development are set forth in the dependent claims.

The bracket according to the invention, according to claim 1, has a (fourth) slot portion, which is oriented substantially parallel to the bracket base 8 of the bracket and which has two opposite slot walls, wherein the opposite slot walls 8 do not lie parallel, but instead enclose an acute angle, preferably in the range of 2-8 degrees, preferably in the range of about 4-6 degrees. This slot serves to receive the archwire and to successively fix the latter with an increase in the arch cross section or position in the slot.

In the bracket according to the invention, there is a specially shaped slot channel composed of several portions, for example (up to) two or four or more portions, wherein these portions preferably have in cross section a profile similar to a siphon (lightning-shaped or s-shaped), and thereby one portion of the slot channel has a narrowing/tapering in which the archwire, inserted by the physician, can be safely clamped or guided through (clamping is also possible by the higher abutment teeth, which lead the arch in the snug fit), and the arch also cannot readily come loose there.

In order that the three-dimensional movement of the teeth from the straight arch via the brackets on the tooth no longer has to be achieved by three-dimensional bending, a new bracket system has been invented here which makes it much easier for the treating physician to connect the brackets, mounted on adjacent teeth, by means of the archwire (arch) and thereby to ensure a secure hold of the arch in the brackets.

Here, the three-dimensional orientation of the teeth according to predetermined values, for example Ricketts, Alexander, Roth, Andrews, Bennett, McLaughlin, Trevisi, is possible without having to effect the bending directly in the arch. The bending of the arch to a small diameter or to narrow intervals is sometimes very problematic, at any rate in brackets according to the prior art.

Due to the provided wings and hooks, as are known from the prior art, there is significant irritation of the soft tissue (tongue, mucous membranes, cheeks, inner aspect of the lips, etc.), especially in the lingual technique.

The bracket according to the invention can completely do without movable bracket parts and has what is explained below as a "basic shape like a tortoise shell".

One or two circumferential grooves (notches) serve to receive possible biomechanical elements, for example steel ligatures, elastics, etc., (also for elastic chains).

Since the intrusion movement of teeth is slower than the extrusion movement, the molars and the canines serve as so-called abutment teeth, which level the adjacent teeth. In angle class III, other positions on the abutment teeth (more occlusal or more apical) for the brackets on the tooth surface are used in order to achieve a corresponding leveling. Here, according to the invention, brackets are also used which have a closed angular (or circular) slot through which an archwire is guided.

The brackets on the anterior teeth (the anterior teeth have for known reasons a lower profile) do not need to have a siphon-like slot wall (see FIG. 12), and the brackets on the premolars, by contrast, have according to the invention a siphon-like slot with a snug fit for the arch(wire). Such a siphon-like slot is defined in the claims and illustrated in the drawings.

In order to gently start the leveling phase with low, biologically acceptable forces, the orthodontic treatment initially involves using an arch with a small, circular cross section. The cross section of the arch is increased every two weeks until one or more arches of rectangular cross section are used.

Through the support of the arch in the closed slots of the canine, abutment tooth and/or the molars and the movements of the arch resulting from contact of food with the arch during eating, a two-dimensional, preferably also three-dimensional, pressure/pull to the inside/outside, up/down—depending on requirements—is exerted, which moves the (angular) archwire successively into its snug fit of the brackets according to the invention.

Precise guiding of the arch is initially largely avoided, so that the force vectors occurring during biting between the oblique cusps and the fissures move the tooth into its natural three-dimensional position.

The material of the brackets according to the invention may consist of a stainless metal alloy and/or plastic and/or glass and/or ceramic, titanium and/or composite materials.

Production according to a 3D printing technology is also possible according to the invention. By virtue of the surface according to the invention having a rounded shape compared to the standard edgewise or lightwire technique, the work can be more germ-free. Moreover, by means of the 3D printing technology, it is possible that brackets produced according to the invention are also produced in the color that corresponds to the patient's tooth color, which is convenient for the patient, because wearing the bracket is then no longer so noticeable.

The invention is shown in the following drawings by way of example.

For the brackets shown in FIGS. 1 and 2, it is possible to use an archwire of circular or rectangular/square cross section.

The advantage of the brackets according to the invention lies not only in the quicker than hitherto fastening of the wire (arch and the above-described arch exchange) for forming dental arches and in the ideal case not only permits a more rapid change of position of the teeth. In addition, the invention permits that the force for the tooth movement is effected not only through the elasticity of the arch material but also through the anchoring at defined abutment teeth. Finally, in the brackets according to the invention, it is possible to entirely omit movable bracket parts, which leads to structural simplification of the bracket body and also avoids fracturing or failure of movable parts.

The outward circumferential groove (or grooves) of the bracket according to the invention permits, on the one hand, that an arch is guided around the bracket there, for the vertical development of one or more adjacent teeth, and is then connected to the adjacent brackets by means of the arch, and, on the other hand, it also permits the anchoring of the bracket, e.g. by means of elastic chains or steel ligatures, etc.

FIG. 1 shows 5 different illustrations or views or cross sections of a bracket according to the invention which is in particular also suitable for an abutment tooth. The abutment tooth, in the orthopedic application, is often a canine and/or a molar.

Figure 1A:
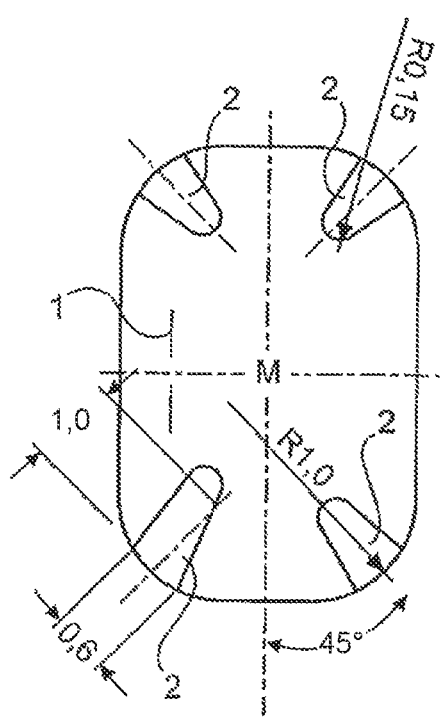
FIGS. 1a and 1b are illustrations of the bracket primarily for canines and molars, i.e. abutment teeth.
Figure 1B:
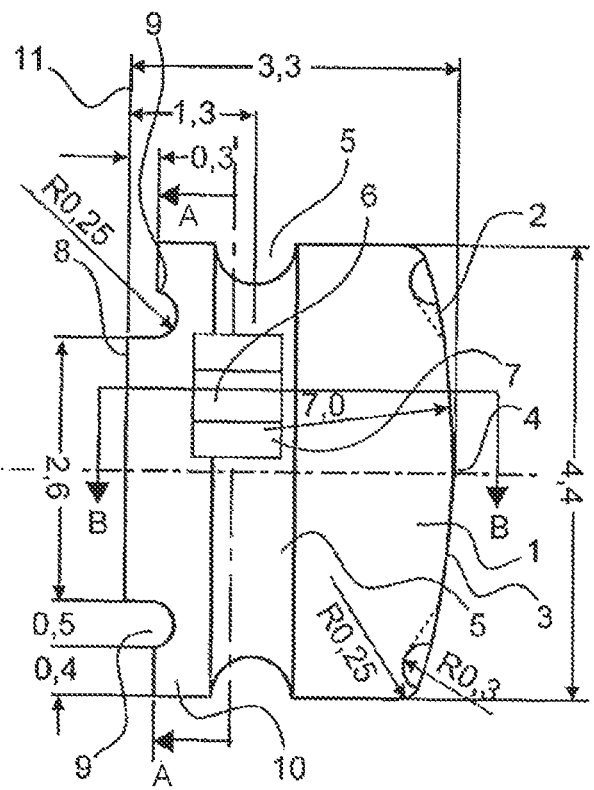
Figure 1C:
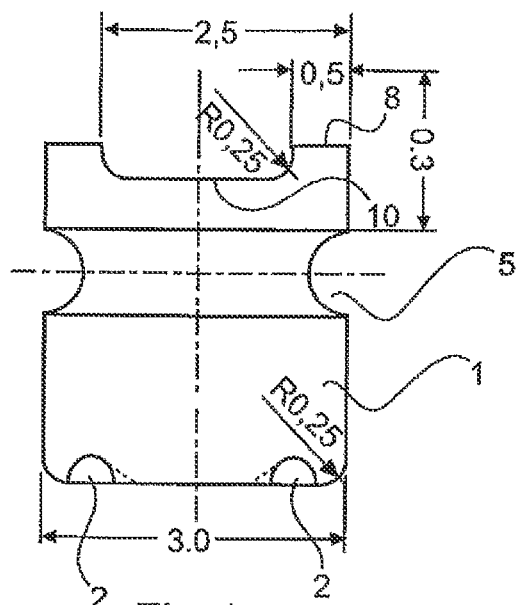

FIG. 1a shows the plan view, FIG. 1b shows a side view from a first perspective, FIG. 1c shows a further view from a side perspective offset by 90 degrees with respect to FIG.

Figure 1D:
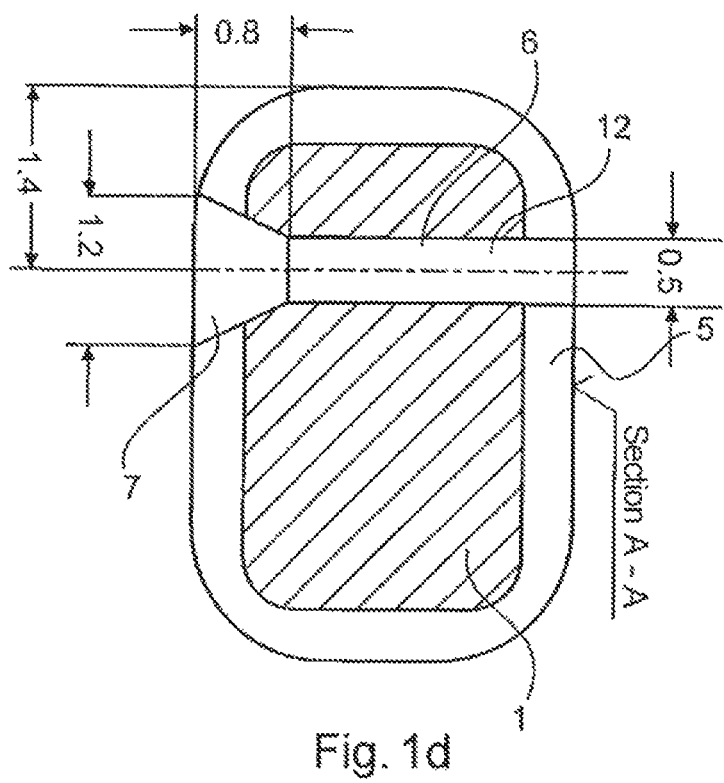
Figure 1E:
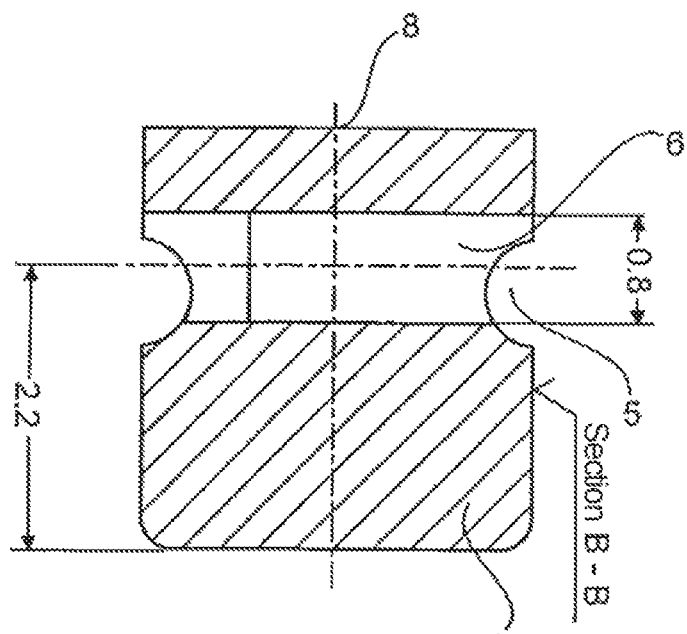

1b, FIG. 1d shows a cross section, and FIG. 1e shows a further cross section of the bracket.

It will be seen in FIG. 1a that the main body of the bracket has an approximately rectangular (or oval) shape, wherein the edges are greatly rounded, such that the plan view depicts a contour also referred to hereinbelow as being like a tortoise shell.

At its four "round corners", the bracket 1 has notches 2 oriented toward the center M of the bracket. These notches are not absolutely necessary, but, if present, they are particularly suitable for the suspension of rubber chains, intermaxillary elastics, etc.

FIG. 1b shows a side view of the bracket shown in FIG. 1a.

It will be seen particularly clearly from FIG. 1b that the bracket upper side 3 is slightly curved, and the notches 2 are arranged below the zenith 4 of the curvature 3.

FIG. 1b also shows a circumferential constriction 5 on the bracket. This constriction can be used, if so required, to guide an archwire around the bracket and thereby exert a defined force on the posterior teeth, which are likewise provided with a bracket, wherein this bracket of the posterior teeth can be either the one shown in FIG. 1 or in FIG. 2 or another bracket.

It will be clearly seen in FIG. 1b that the bracket has an aperture 6 which, in the example shown, has a rectangular opening. This opening can of course also have another cross section, just as the rectangular cross section of the aperture shown in FIG. 1b can likewise have another profile, e.g. oval or round, or square, etc.

It will be seen in FIG. 1b that the opening 7 of the aperture 6 is larger than the diameter and the profile of the aperture 6. This is shown better in FIG. 1d and is also described there. This funnel-shaped opening serves for simple engagement of the archwire.

The bracket upper side or curvature 3 lies opposite the bracket bottom 8.

In the example shown, it can be very clearly seen that the bracket bottom 8 has a much smaller surface area than the bracket upper side.

Thus, for example, in FIG. 1b the bracket upper side is 4.4 mm long, while the bracket bottom is only 2.6 mm long.

Laterally on the bracket bottom, grooves or notches 9 are formed which are arranged parallel to the aperture 6 and which are directed away from the bracket bottom into the bracket interior. These grooves 9 are in particular suitable for receiving steel ligatures, rubber rings or the like. At the same time, the grooves 9 are not absolutely essential, but they are advantageous if a force is also intended to be exerted on the tooth via a steel ligature or elastic chain or rubber ring or the like.

It can also be clearly seen that the outer bracket edge 10 does not reach as far as the plane 11 of the bracket bottom 8.

It is thereby possible for the treating physician, orthodontist or the like to place an archwire on this part of a bracket too, if this is necessary.

The notches/grooves 9 shown in FIG. 1b are not absolutely essential for the bracket according to the invention shown in FIG. 1, but, if they are present, they make it easier for the treating physician, orthodontist or the like to perform a placement of the archwire that would not be possible without the notches/grooves 9, e.g. in order to lift the tooth, using an identical universal bracket as it were.

FIG. 1c shows an outer view, offset by 90 degrees, of the bracket shown in FIG. 1b.

It will be clearly seen that the constriction 5 extends around the whole bracket, and the notches 2 at the upper side of the bracket can also be seen.

It will also be seen in FIG. 1c that the bracket edge 10 is not drawn down as far as the plane of the bracket bottom.

FIG. 1d shows a cross section through the bracket according to FIG. 1b, along the section line A-A.

Here, the bracket core (hatched area) of the bracket 1 can be clearly seen, likewise the non-centrally arranged aperture 6 with its opening 7.

Of course, the aperture 6 with its opening 7 can also be arranged centrally and, furthermore, can have a position inside the bracket different than that shown in FIG. 1d.

FIG. 1 shows the circumferential constriction 5, which preferably serves to receive rubbers, chains, elastics, steel ligatures, sometimes also the arch material.

The aperture 6 is so large that a corresponding archwire (arch) can be guided/threaded through it.

It is not absolutely necessary that the opening 7 widens outward over the arch of the aperture 4, but, if this is the case, this sometimes makes it easier, on the one hand, to thread the archwire for passage through the bracket and, on the other hand, it also means that the arch material can be guided not only in a single virtually linear continuation of the channel 12 of the aperture 6 but can also leave the latter at another angle, if this is wanted by the treating physician.

Of course, it is also possible that the widened opening 7 is also arranged on the opposite side of the aperture 6 of the bracket 1 and, therefore, the bracket can if necessary also have two widened openings.

FIG. 1e shows a cross section through the bracket according to the invention and the view according to FIG. 1b along the section line B-B.

In the further FIGS. 1a*, 1b*, 1c*, 1d*, 1e*, the views shown in FIGS. 1a to 1e are shown once again, but with complete dimensioning.

FIG. 2 shows a further variant of the bracket according to the invention with certain modifications in relation to the bracket shown in FIG. 1.

Figure 2A:
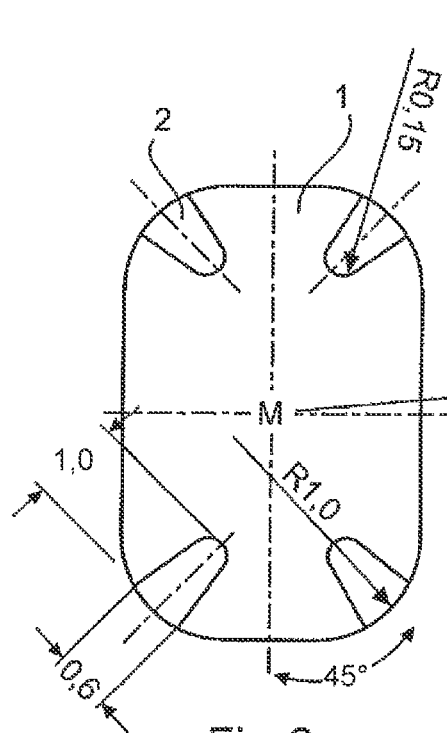
FIGS. 2a and 2b are illustrations of the bracket according to the invention primarily for the incisors and premolars.

Once again, FIG. 2a shows a plan view of the bracket as is already known from FIG. 1a.

Figure 2B:
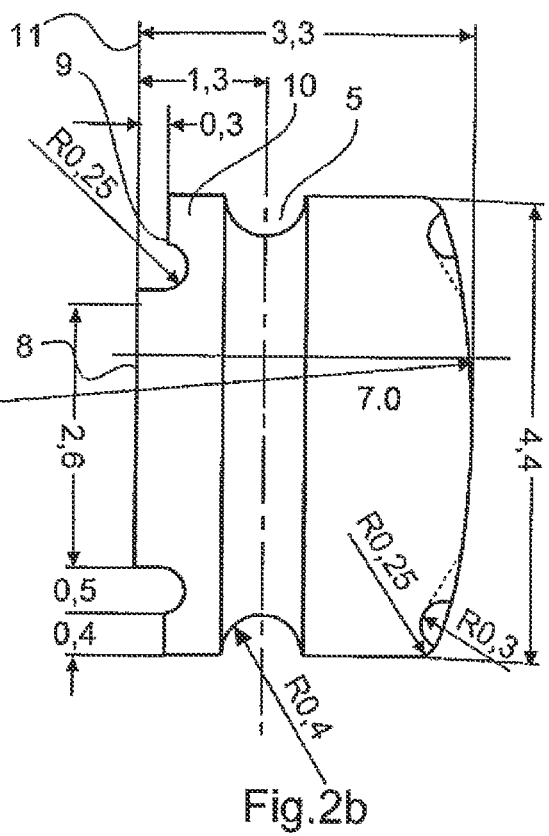
Figure 2C:
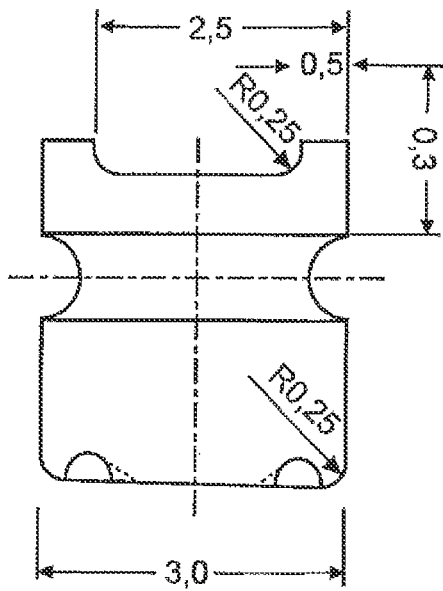

FIG. 2b shows the bracket body already described likewise in FIG. 1a, but without the aperture 6 with the opening 7. FIG. 2c shows, similarly to FIG. 1c, a side view at 90 degrees in relation to FIG. 2b.

In the illustration according to FIG. 2, the circumferential constriction 5 can again be seen, the bracket bottom 8 and the notch 9 oriented vertically in the bracket bottom.

The bracket shown in FIG. 2 is suitable for correspondingly receiving in a desired manner, via the notches 2, the constriction 5 or the notch grooves 9, an archwire for the treatment purposes.

Figure 3A:
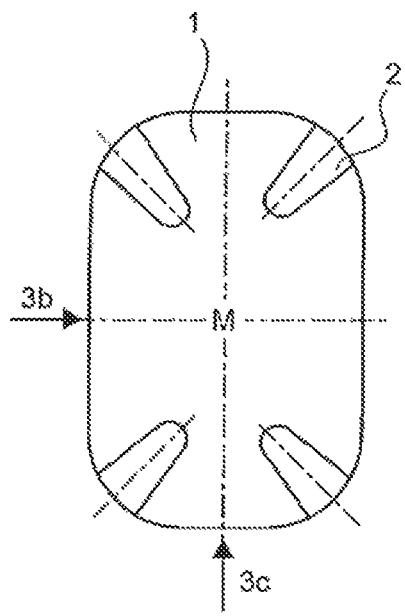

FIG. 3 shows a first embodiment of the bracket according to the invention described in claim 1. FIG. 3a again shows the plan view of the bracket according to the invention, already known from FIGS. 1a and 1b, with the notches 2 which are formed at the "round corners" and which are oriented in the direction of the center of the bracket.

Figure 3B:
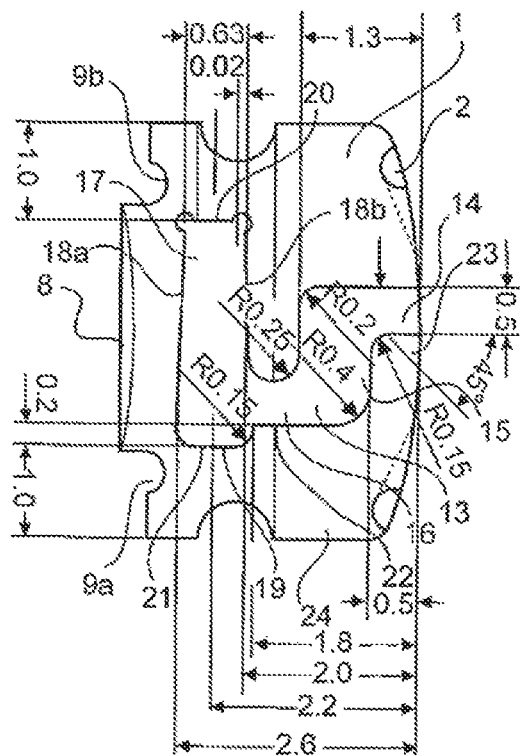
Figure 3C:
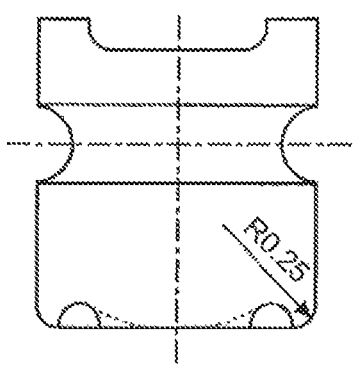

FIG. 3b shows the side view of the bracket shown in FIG. 3a, while FIG. 3c shows a side view offset by 90 degrees.

It will be seen in FIG. 3b that the bracket according to the invention has a slot 13 which extends in the mesiodistal direction and which receives an archwire (not shown).

It can be clearly seen in FIG. 3b that the slot 13 has a plurality of portions, namely a first portion 14, via which the archwire is inserted into the slot 13.

The first slot portion 14 is adjoined by a second slot portion 15, which extends substantially perpendicularly with respect to the first slot portion 14.

The second slot portion 15 is adjoined by a third slot portion 16, which is oriented in the direction of the bracket bottom 8 and thus substantially perpendicular to the second slot portion 15 and thus also substantially parallel to the first slot portion 14.

Finally, a fourth slot portion 17 is formed, which extends substantially parallel to the second slot portion 15 and thus is also oriented substantially perpendicular to the third slot portion 16.

An archwire inserted into the bracket thus passes via the first slot portion 14 to the slot portion 15, then to the slot portion 16 and then finally into the slot portion 17, where it is clamped between the opposite walls 18a, 18b of the slot portion 17.

As can be clearly seen in the illustration, the opposite walls 18a and 18b of the slot portion 17 are not arranged parallel to each other, but instead provided with a slightly tapering angle α, such that the wall spacing between 18a and 18b of the slot portion 17 and the distance of its lower base 19 from its end 20 decreases (continuously). In the example shown, α is about 4-5°; an angle in the range of about 2°-8° is advantageous.

The widths (wall spacings) of the slot portions 14, 15 and 16 are always at least as great as the average dimension of the slot portion 17.

The place where the archwire is clamped in the slot portion 17 depends largely on its diameter, its material and its cross-sectional profile.

The larger the diameter, the more likely the archwire cannot be inserted and clamped as far as the end 20 of the fourth slot portion 17.

By virtue of the fact that the opposite walls 18a, 18b of the fourth slot portion 17 come only slightly further and further closer over the length as far as the end 20 of the last portion, an archwire can be clamped in the fourth slot portion 17 extremely precisely and reliably.

If, in a patient in whom the bracket shown in FIG. 3 is attached to the teeth for orthodontic measures, a force were to act on the arch, during eating, along the slot channel 17 in the direction of slot portion end 19, e.g. caused by food residues, bone, etc., and if the archwire were to be moved in the direction of the bottom 19 of the fourth slot portion, i.e. released from its clamped state, then the arch in the wire cannot directly return into the slot portion 16, as long as the archwire lies at the bottom 19 of the slot channel 17, because this bottom, as shown in FIG. 3b, has a bottom plane 21 which lies below the wall plane 22 of the third slot portion 16. As can be clearly seen in FIG. 3b, however, in order to be inserted into or guided out of the bracket, the arch must be guided along all four slot portions and, as can be clearly seen in FIG. 3b, the overall slot layout is arranged similarly to a siphon. This prevents unwanted separation of the arch from the bracket.

First tests (not published) have shown that the bracket illustrated in FIG. 3b permits an extremely reliable fastening of the archwire to the bracket and in particular makes the introduction of the archwire much faster than is possible with the previously known brackets.

As can also be seen in FIG. 3b, the opening of the first slot portion 14 is slightly opened in the direction of the outward curvature.

This serves, on the one hand, to make the introduction of the bracket easier, but on the other hand it also means that, in contrast to previously known brackets from the prior art, no less/sharp edges form on the bracket, of the kind that can irritate the soft parts, in particular on the inner lip.

The widened opening 23 of the first slot portion 14 is not absolutely necessary, but it is particularly advantageous if irritation of the skin or the soft parts (inner lip) is to be avoided.

FIG. 3c shows an external view at 90 degrees in relation to FIG. 3b.

FIG. 3 shows a bracket which serves to correct a tooth position and which has a bracket base 8 fastenable to a tooth, and a bracket body 24 having a slot 16 that extends in the mesiodistal direction and that has a first slot portion 14 for insertion of the archwire into the bracket, wherein the first slot portion 14 is adjoined by a second slot portion 15 which extends substantially perpendicular thereto and which is adjoined, in the direction of the bracket base 8, by a third slot portion 16, wherein the second slot portion 15 extends substantially perpendicular to the first slot portion 14 and to the third slot portion 16, and the third slot portion 16 is adjoined by a fourth slot portion 17, which extends substantially parallel to the second slot portion 15.

As is shown and described, the fourth slot portion 17 is longer than the second slot portion 15.

It is particularly advantageous if the fourth slot portion 17 narrows at a certain region of its portion and has, at its narrowest point, a slot width which is preferably less than that of the diameter of the archwire.

It is also particularly advantageous if the first slot portion 14 has a widening opening 23, in order to facilitate the insertion of the archwire and to reduce irritation of the soft parts.

The bracket base 8 is preferably meshed (waffle-like) and, by the design of the particularly shaped crimped edge (this may also be a beveled edge with about 15 degrees and a cut edge) and the at the "outlets", i.e. the grooves 9, excess plastic that escapes easily when bonding the bracket to the tooth can be removed at the top or bottom in the region of the edges.

The arch material can be hitherto known arch material, preferably of the order of size of 0.12 inches to 0.25 inches.

The arch materials used are preferably round, but they may also be rectangular, oval, trapezoid or square in cross section.

With the bracket according to the invention, a very significant reduction of friction is achieved.

The conically tapering slot of the slot channel 17 and also the surface of the arch material contribute to the reduction in friction, and on this surface preferably a multiplicity of small "micro-hemispheres" are formed, as a result of which only a punctiform bearing surface is obtained, by means of which the reduction in friction is achieved.

When the arch material rests in the conically tapering slot, the arch material does not rest directly on the wall of the slot channel, but rather on a plurality of "micro-hemispheres", e.g. on three to ten of the elevations formed by the "micro-hemispheres". Instead of the micro-hemispheres, web-like elevations 25 running alongside one another in the longitudinal direction of the fourth slot channel can also be formed in the latter (this is explained in FIG. 4), which elevations, like the micro-hemispheres, ensure that the archwire does not about the slot channel over the entire surface of the slot channel wall, but only where the micro-hemispheres or web-like elevation form. The advantage of this design of the micro-hemispheres or the web-like elevations 25, 38 is that a better reduction in friction can be achieved by the few support points.

Overall, are the in the slot channel 17 more than ten raised support points, which preferably hemispherical or several, e.g. webs 25 formed.

These raised support points or webs 25, which are for example made in one piece with the bracket, have, in addition to the stated friction reduction, also the advantage that the arch material can better position itself between the hemispherical elevations (under certain circumstances also clamp), such that the seat of the arch material in the fourth slot portion 17, which leads upward, can be improved.

The raised support points formed in the fourth slot portion 17 have at the base a diameter of, for example, up to 100 μm, are substantially circular at the base and have a height of 25 μm.

Figure 4:
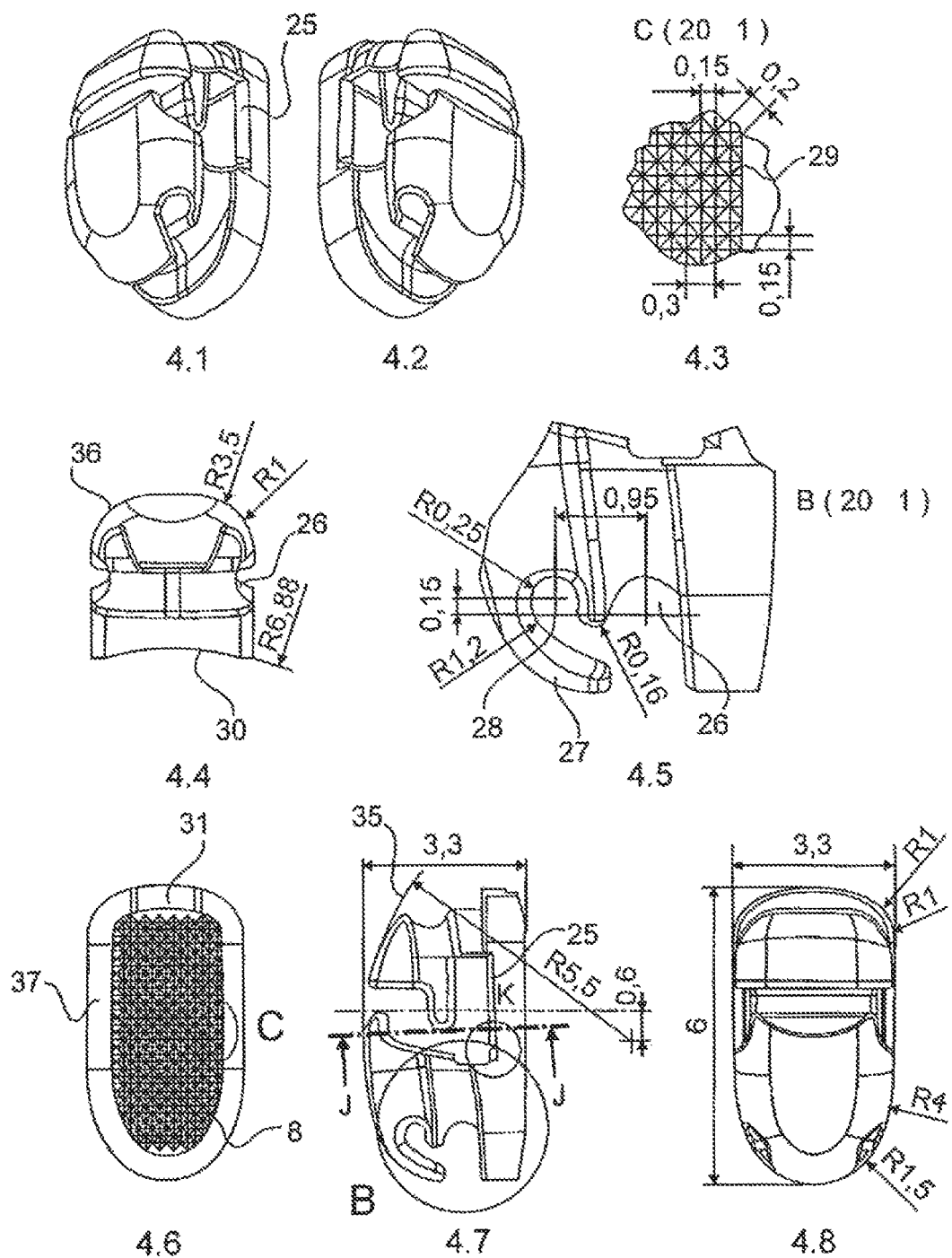
Figure 4:
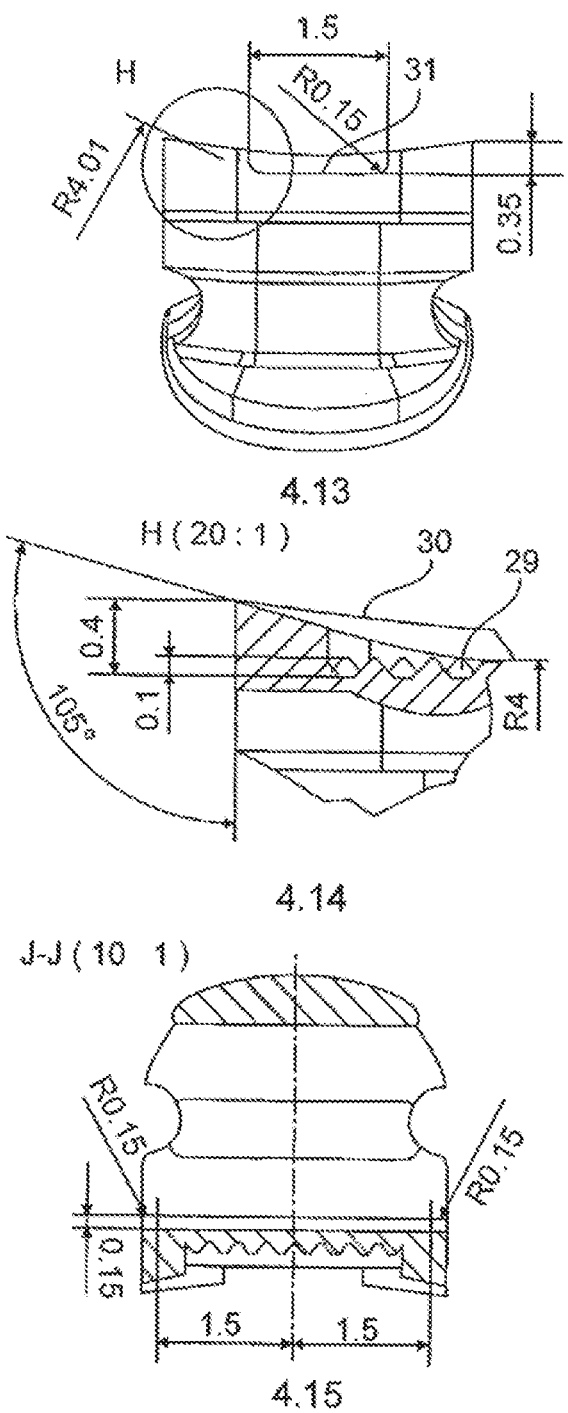

FIG. 4 shows 15 illustrations of a further embodiment of a bracket according to the invention.

FIGS. 4 and 5a to 5g show corresponding representations of the bracket shown in FIG. 4, with further details.

FIGS. 6a to 6f show a bracket for an abutment tooth or canine tooth.

FIG. 7 shows the underside of the brackets illustrated in FIGS. 4 to 6.

In general, it should first be noted that the bracket according to the invention according to FIGS. 4 and 5, as well as the bracket according to FIG. 6, has a kind of tortoise shell structure for the surface, i.e. has a surface which is substantially oval when viewed from above and flattens toward the edges, on all sides, thus feeling smooth in the patient's mouth, especially on the inner aspects of the lips.

Various perspectives of the bracket according to the invention can be seen in FIGS. 4.1 and 4.2.

For the technical understanding of these figures, reference is made to all of the following figures which, in different views, show one and the same embodiment in the various views, sectional views and perspectives. These views are also largely self-explanatory to persons skilled in the art.

Insofar as a dimension is indicated in the figures, this is to be understood merely as an example and is by no means restrictive.

FIG. 4.11 shows a cross-sectional view of the bracket according to the invention with the first slot portion 14, the second slot portion 15, the third slot portion 16 and the fourth slot portion 17.

FIG. 4.11 itself is an enlarged view of the detail a according to FIG. 4.9, which shows the entire bracket construction from the side view.

In FIGS. 4.1, 4.2, 4.7, 4.9 and 4.11, it can also be seen that one or more webs 25 are formed in the fourth slot portion in the longitudinal direction I, on the side of the slot wall 18a facing toward the bracket bottom 8. The function of these webs is that, when the arch material comes to lie in the fourth slot portion, the arch is on the one hand pressed against the slot wall 18b over the entire surface area, whereas on the other hand it does not lie on the entire surface of the slot wall 18a, but instead only on the webs 25 there, the result of which is that the friction is reduced (that the contact force with which the arch lies on the webs is significantly greater than if the arch material were to rest on a flat slot wall). The high pressing force prevents the arch from being moved out of the fourth slot portion by chewing movements, food residues or other forces exerted on the arch by the patient.

Figure 11:
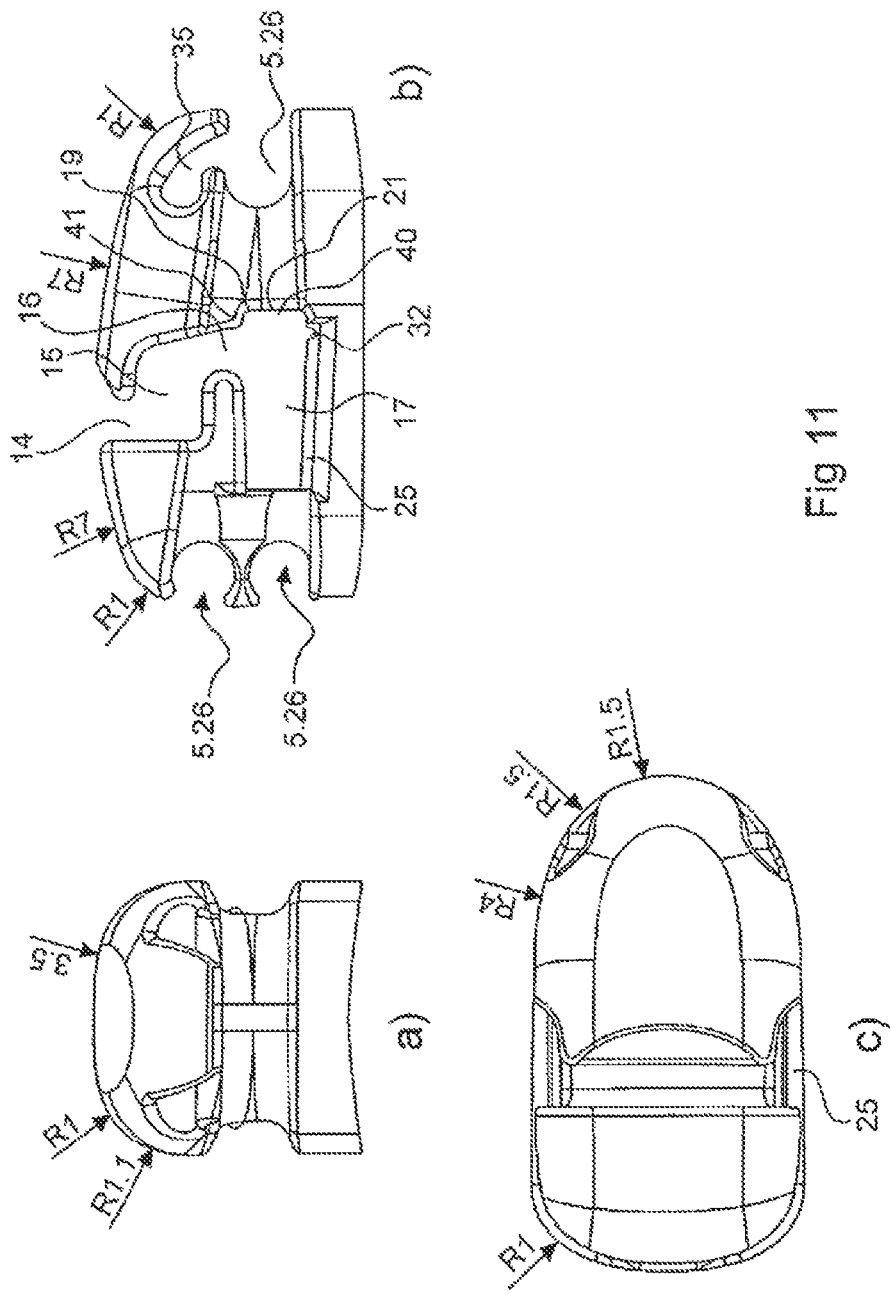

On the slot wall 18a, as can be clearly seen in FIG. 4.12 (an enlarged detail from FIG. 4.11 or FIG. 4.7), a material thinning can be seen between the slot wall 18a and the bracket as a predetermined breaking point between the slot wall 18a and the bracket bottom 8. This predetermined breaking point has the special purpose that, when the entire bracket is to be removed from the tooth, first the lower part 33 of the bracket shown in FIG. 11 is bent (with force) in the direction of the other part 34, and thus the lower part 33 breaks off from the remaining part 34 of the bracket.

It is then easier for the practitioner either to withdraw the entire arch from the fourth slot portion and/or on the other hand to detach the entire bracket from the tooth on which the bracket is affixed.

The underside of the bracket is shown in FIG. 4.6 and in an enlarged view in FIG. 4.3. It can be clearly seen that the bracket bottom—as would also be entirely possible, but held differently in the example shown—is not flat but instead has a lattice-like (or meshed) structure, so that adhesive between tooth and bracket can bind very well to the bracket material.

If the adhesive material is applied to the bracket bottom 8 and in some cases too much material is applied, then, as can be clearly seen in FIG. 4.6, FIG. 4.13, FIG. 4.14 and FIG. 4.15, an outlet channel for adhesive is formed on one side of the bracket (on the "obtuse side" of the oval-shaped main portion in the example illustrated). This has the advantage that most of the excess adhesive material preferably exits there only when the bracket is pressed onto the tooth, and the excess adhesive material can then be correspondingly easily removed there from the person to be treated, and the entire outlet channel is also at the same time closed and sealed by the exiting adhesive material and thus forms there, after curing, as it were the end edge of the bracket.

FIG. 4.14 also shows in cross section only the rough, lattice-like surface structure 29 of the bracket underside which, as has been mentioned, serves to provide this side of the bracket with a larger surface area, such that the adhesive has more opportunity there to find a secure hold on the bracket.

As can be seen in FIG. 4.4 but also in FIGS. 4.13, 4.14 and 4.15, the entire cross section, that is to say in the mesial to distal direction of the bracket the entire bracket bottom, is not flat and is instead provided with a slight curvature 30. This curvature simulates the natural curvature of the tooth, and, in the case of a bracket z according to the invention, the brackets of the set can also be distinguished by different radii of curvature, such that the treating physician always has the possibility of selecting the bracket that is optimized in terms of curvature on the tooth to be applied.

As can be seen in FIGS. 4.1 and 4.2, and also in FIGS. 4.5, 4.7, 4.11 and 4.15, the bracket according to the invention also has a constriction 5 which however does not extend, as shown in FIG. 1b, parallel to the bracket bottom but instead at a slight angle thereto. On the one hand, this constriction serves for insertion there of a ring of e.g. elastic material (e.g. rubber), with the result that the arch located in the fourth slot portion can then no longer be moved out of the fourth slot portion without removing the ring.

On the other hand, however, the arch itself can also be inserted into the setting 5, 26 surrounding the bracket so as to place a twisting (torsional) force on the tooth center, for example in order to move the tooth into its desired vestibular/oral/vertical direction or to hold it there.

As can be seen particularly clearly in FIGS. 4.5, 4.7 and 4.9, the bracket also has a drawn-down bracket edge 27, which encloses a recess 28. The drawing down of the bracket edge has the consequence that the tortoise shell structure is improved for the entire bracket surface and no apical/lingual sharp edges are formed, and, on the other hand, arch material can also come to rest in the recess 28, thereby tilting the tooth toward the interior of the mouth or in the direction of the lips or exerting a corresponding force on the tooth.

FIG. 4.10 shows a cross section of the bracket according to the invention along the section line G. This section line runs quasi centrally through the middle plane of the constriction recess of the bracket. As can be clearly seen in FIG. 4.10, the cross section of the upper bracket portion is substantially rectangular or square there, while the cross section of the lower bracket portion 33 is substantially semicircular.

Figure 4A:
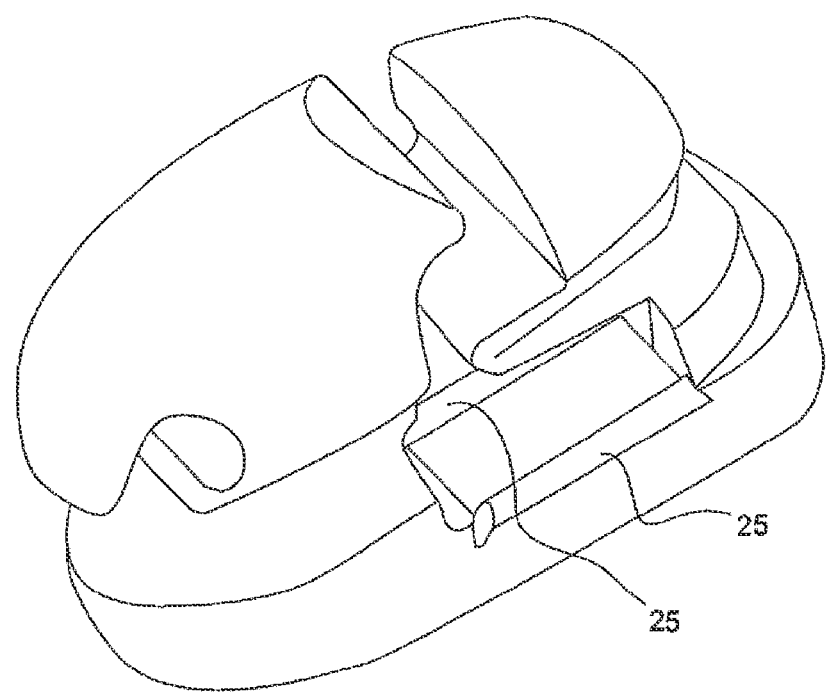
Figure 4B:
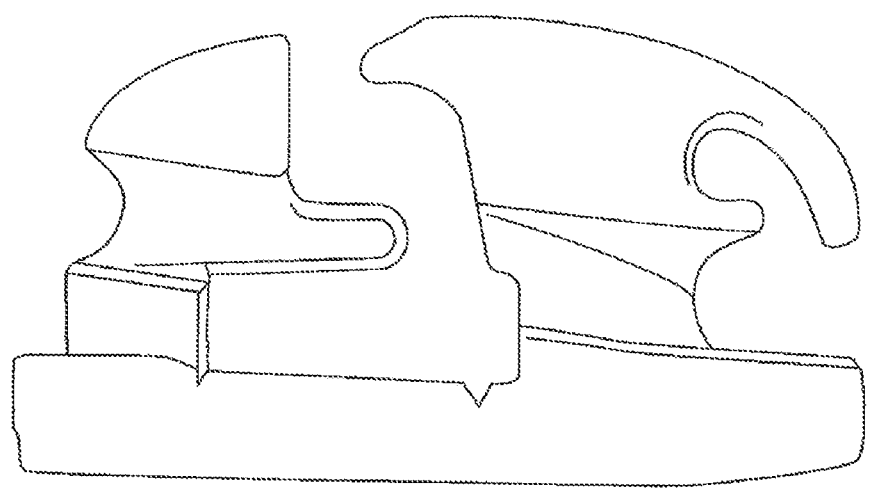
Figure 4C:
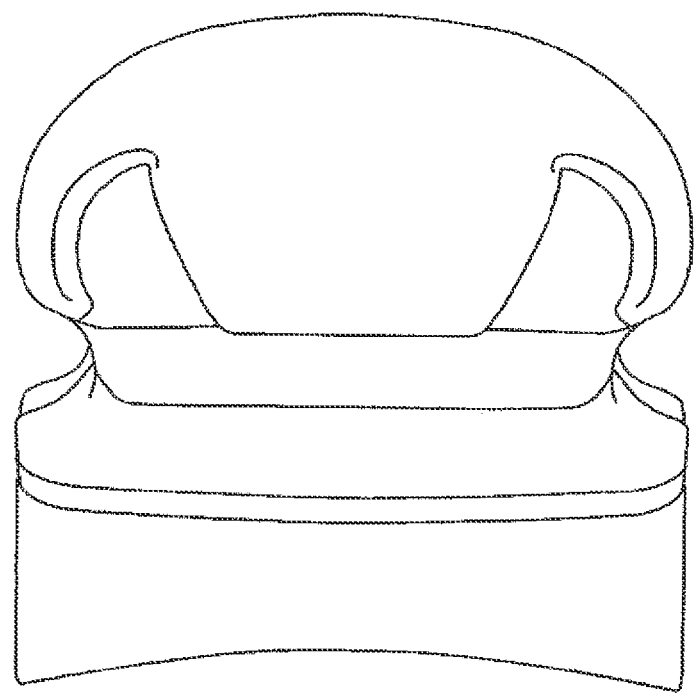
Figure 4D:
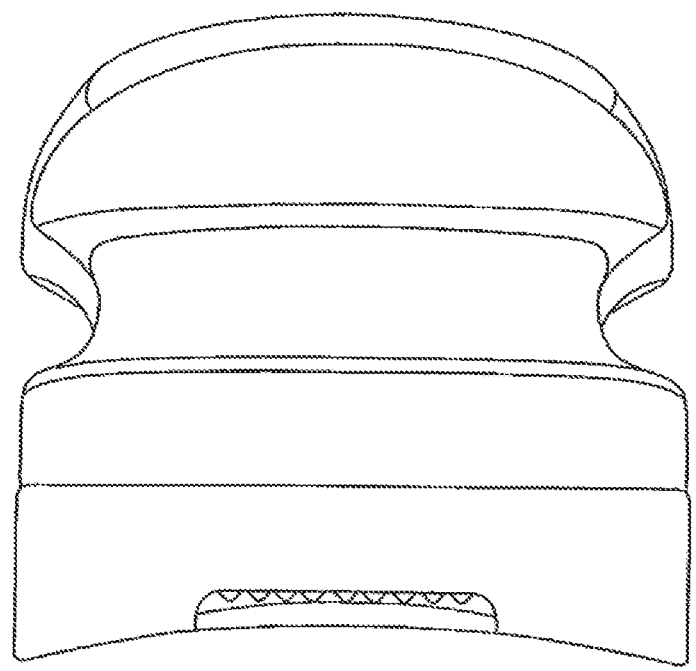
Figure 4E:
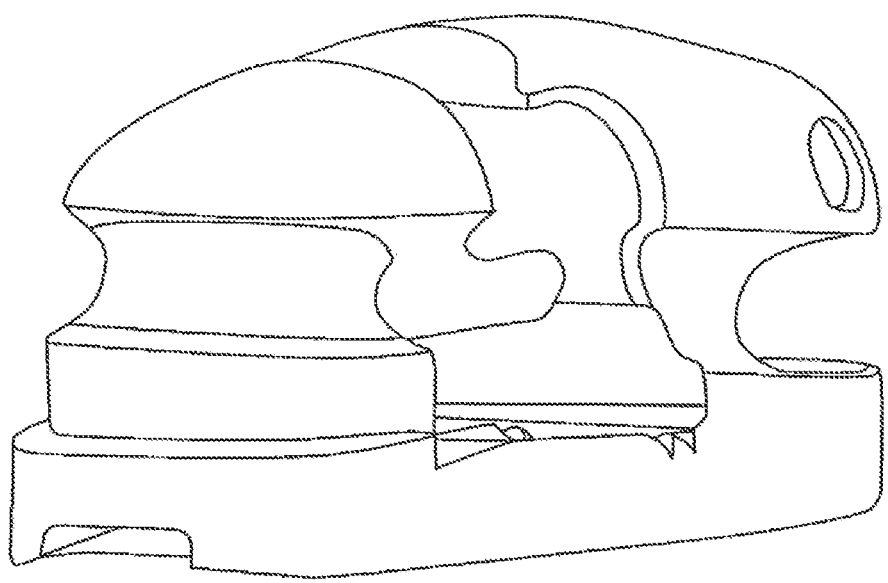
Figure 4F:
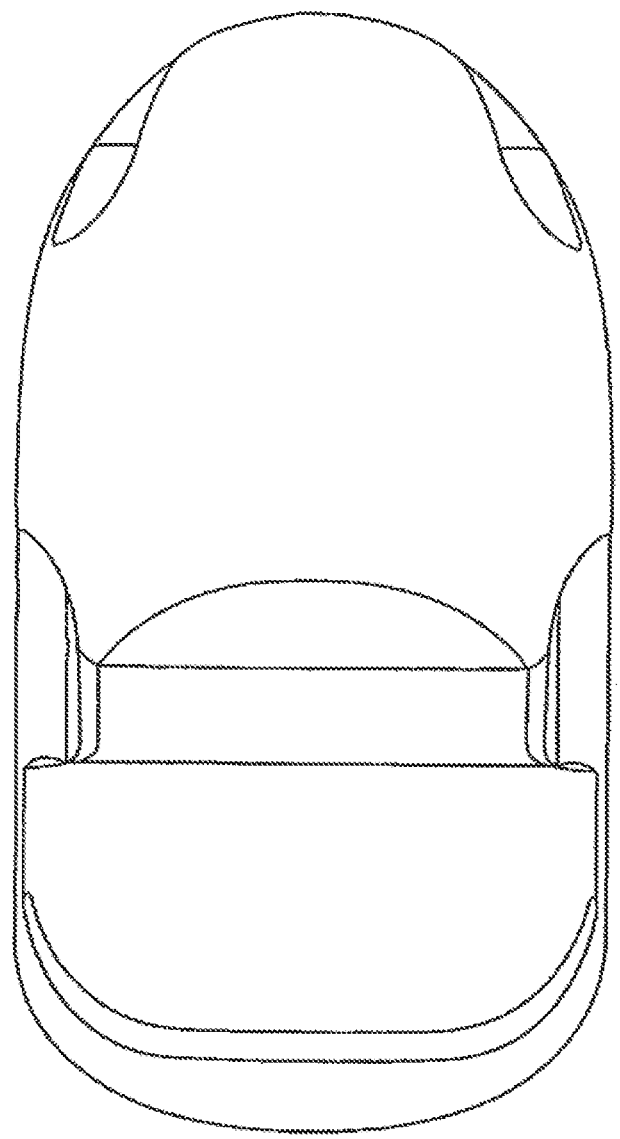
Figure 4G:
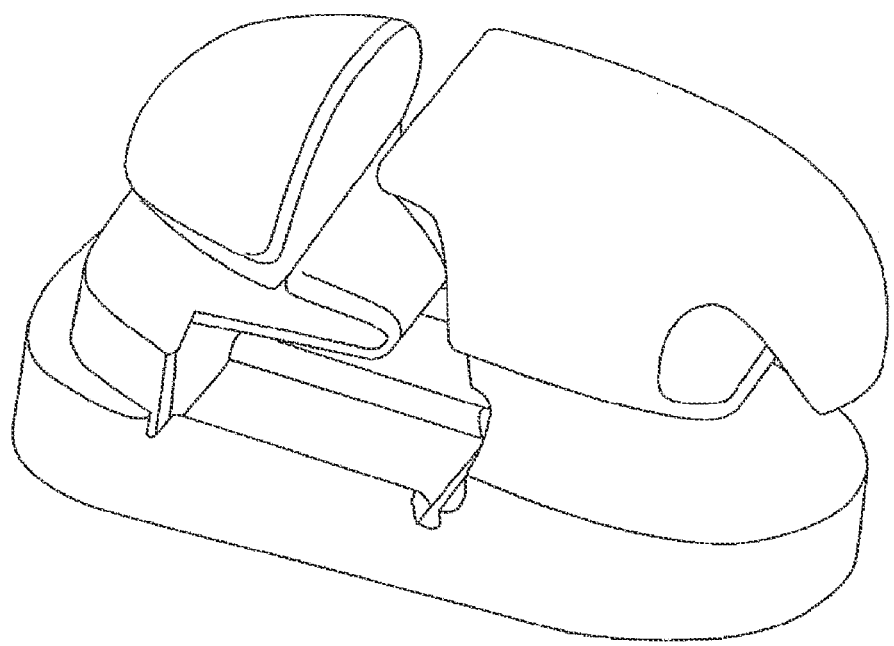
Figure 5A:
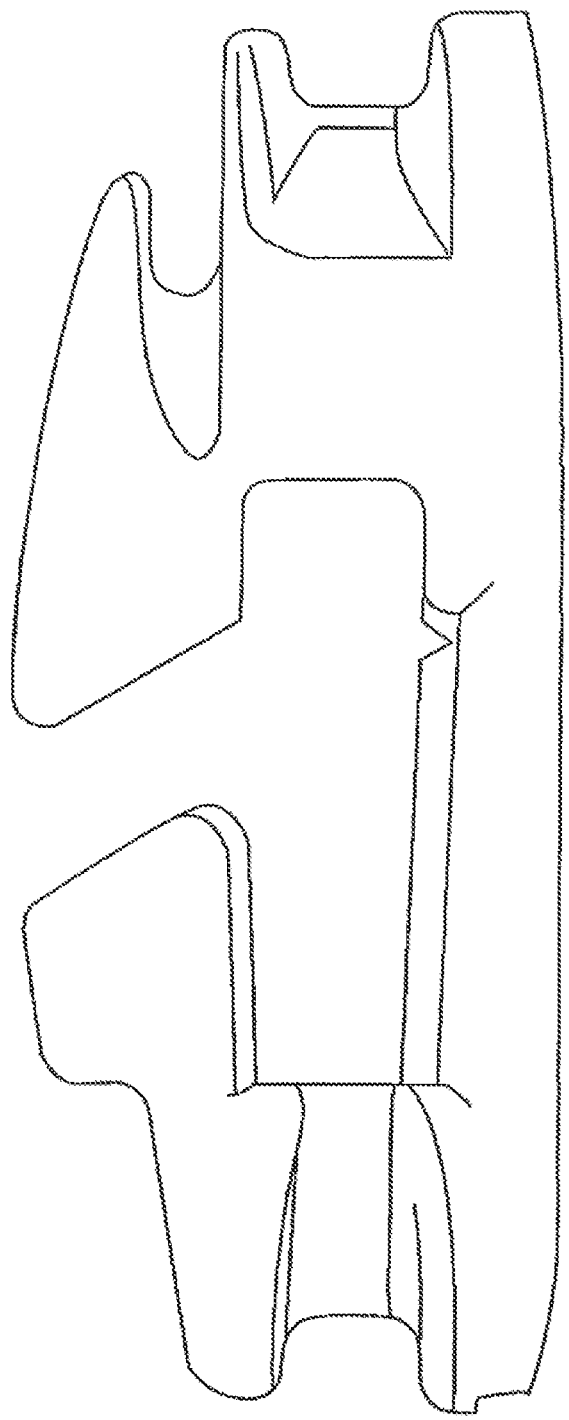
Figure 5B:
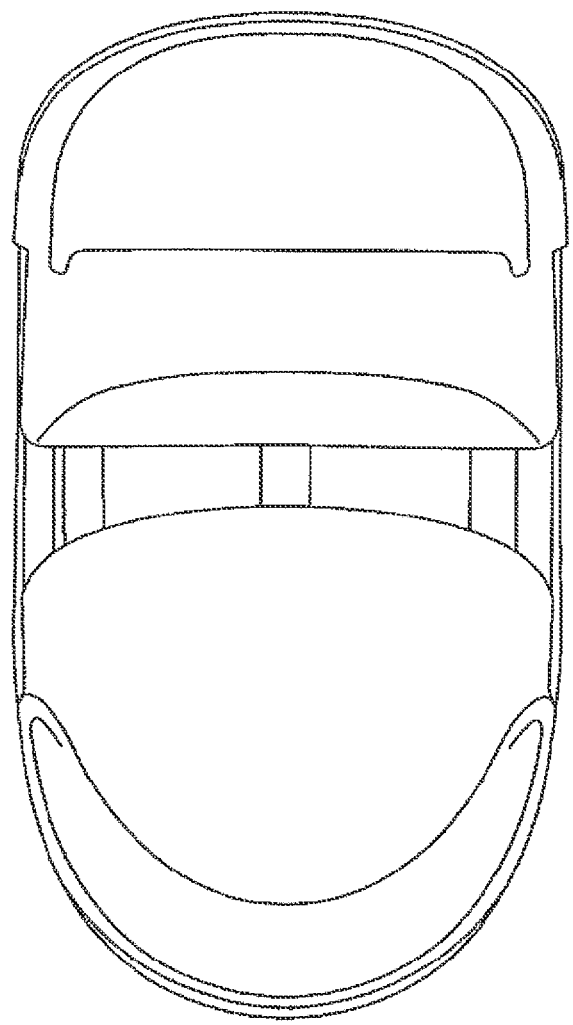
Figure 5C:
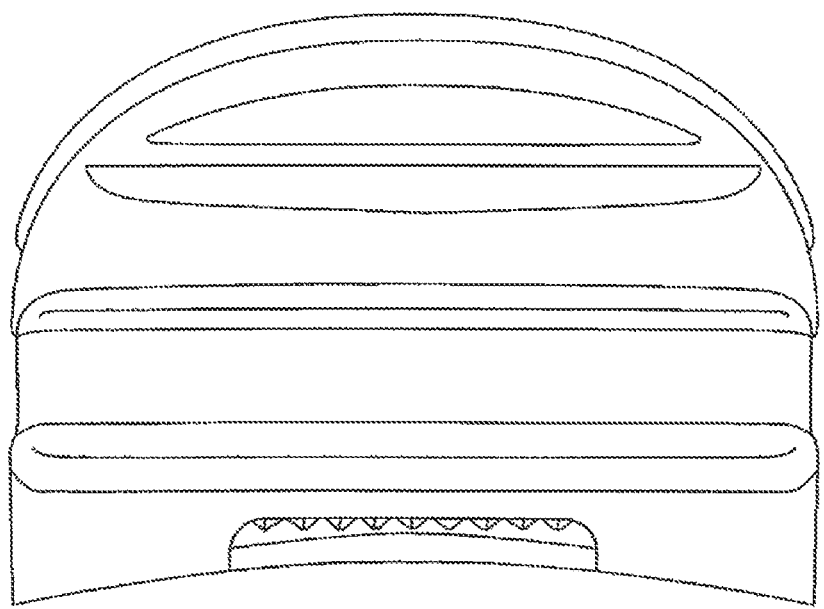
Figure 5D:
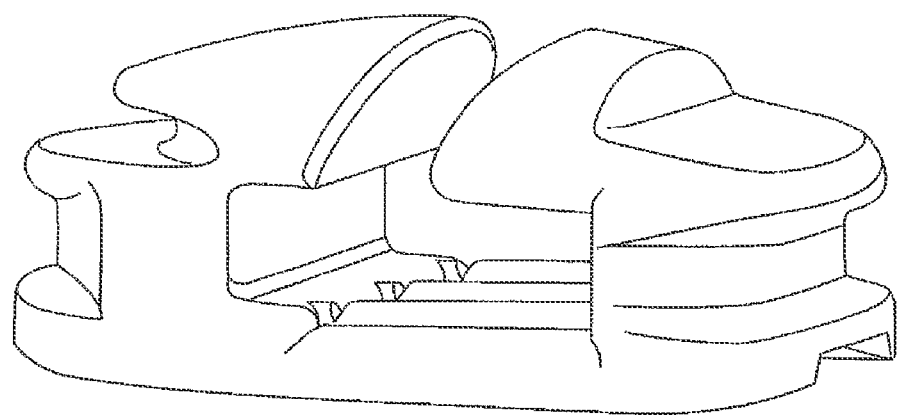
Figure 5E:
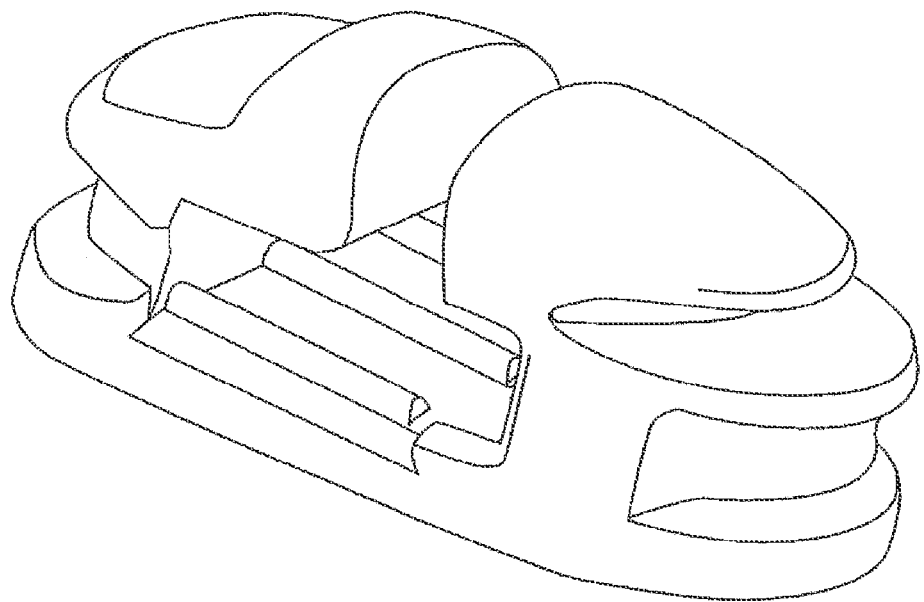
Figure 6A:
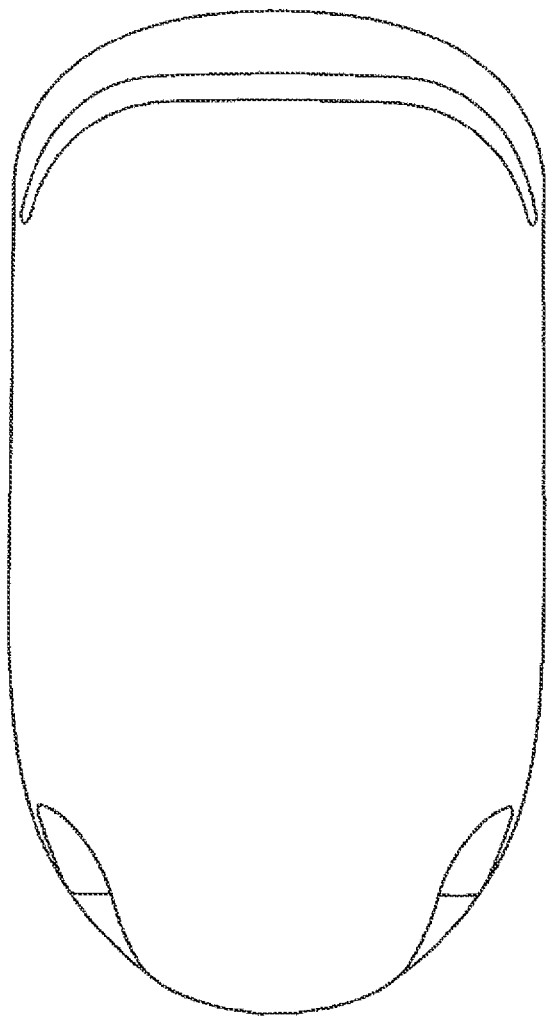
Figure 6B:
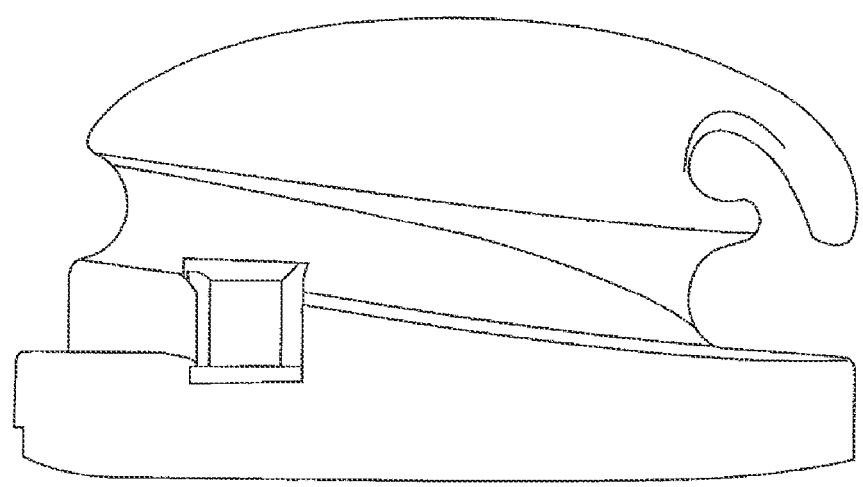
Figure 6C:
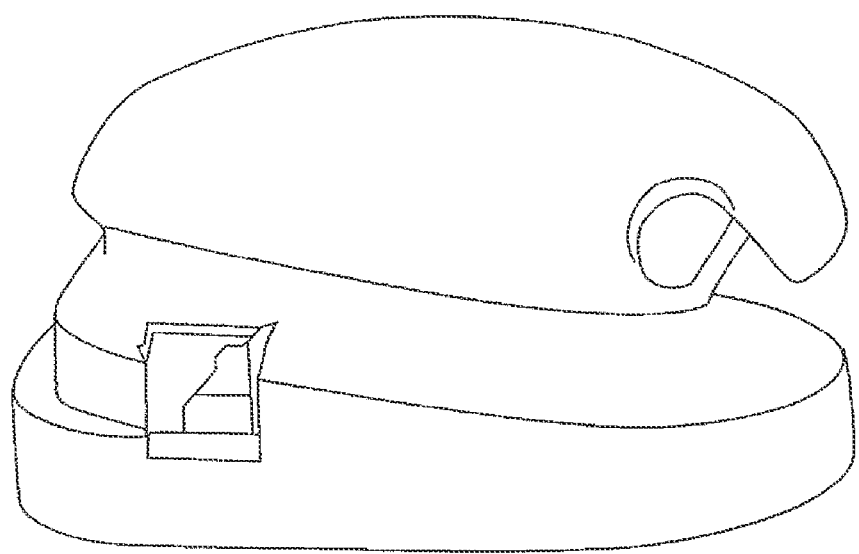
Figure 6D:
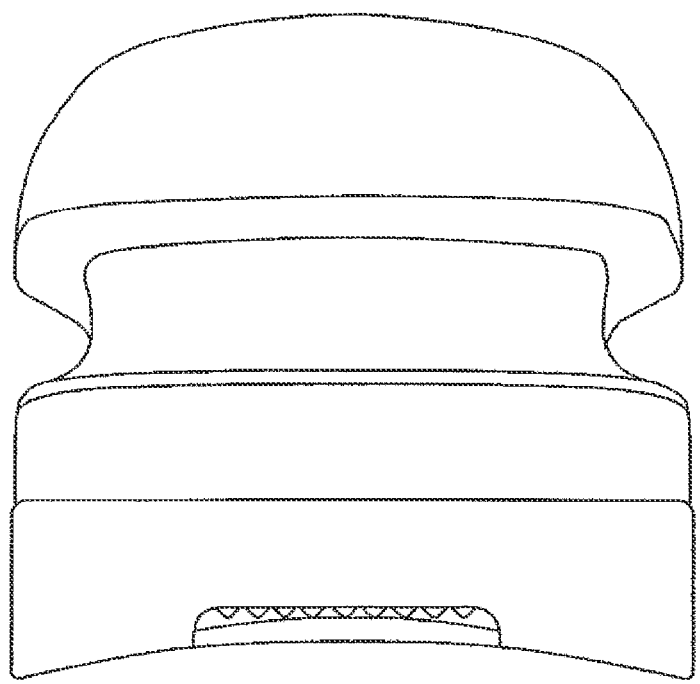
Figure 6E:
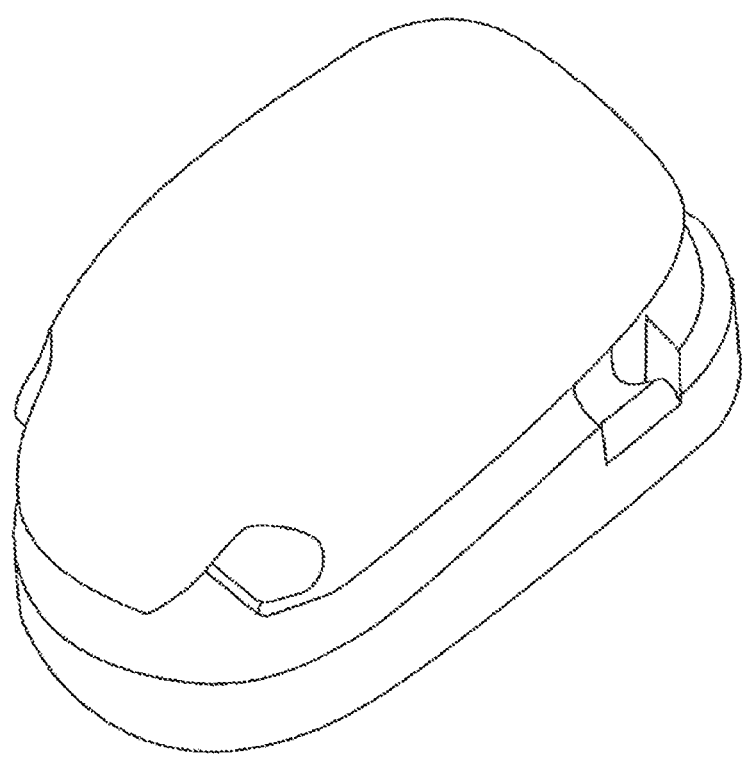
Figure 6F:
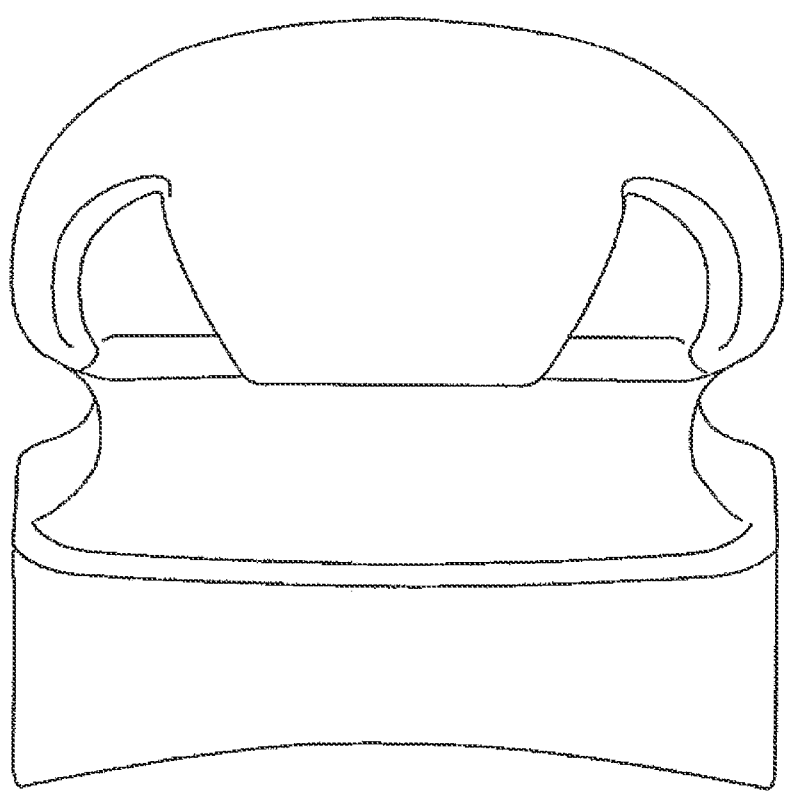

The further figures, i.e. FIGS. 4*b*, 4*c*, 4*d*, 4*e*, 4*f* and 4*g*, show enlarged views of the bracket shown in the various views in FIG. 4*a* and for better clarity of the entire three-dimensional bracket body. It can be seen particularly clearly that the bracket body, in terms of its longitudinal direction, follows approximately a circumference of a circular line 35 (in FIG. 4.7 with dimension R5.5), while the bracket surface in the transverse direction q likewise traces a circumference of the circular line 36, which is dimensioned in FIG. 4.4 with R3.5, by way of example.

The "roundness" of the bracket surface can also be seen particularly clearly in FIGS. 4*c*, 4*d*, 4*b* and 4*g*.

FIGS. 6*a*, 6*b*, 6*c*, 6*d*, 6*e* and 6*f* show an alternative embodiment for the bracket, as also shown in FIG. 1*b*. It is a bracket design in which an aperture (tunnel) 6 is formed through which an archwire is pulled, with which a fixing point for the orthodontic treatment is found in a particular way.

Such a bracket is attached in particular to the teeth which serve as a fixing point, be it, for example, a molar or, for example, a canine.

As can be clearly seen in FIG. 6, this bracket also has a constriction 5 extending at a defined angle to the bracket bottom, and likewise a drawn-down bracket edge 27, and also a recess 28 enclosed therewith.

Figure 7A:
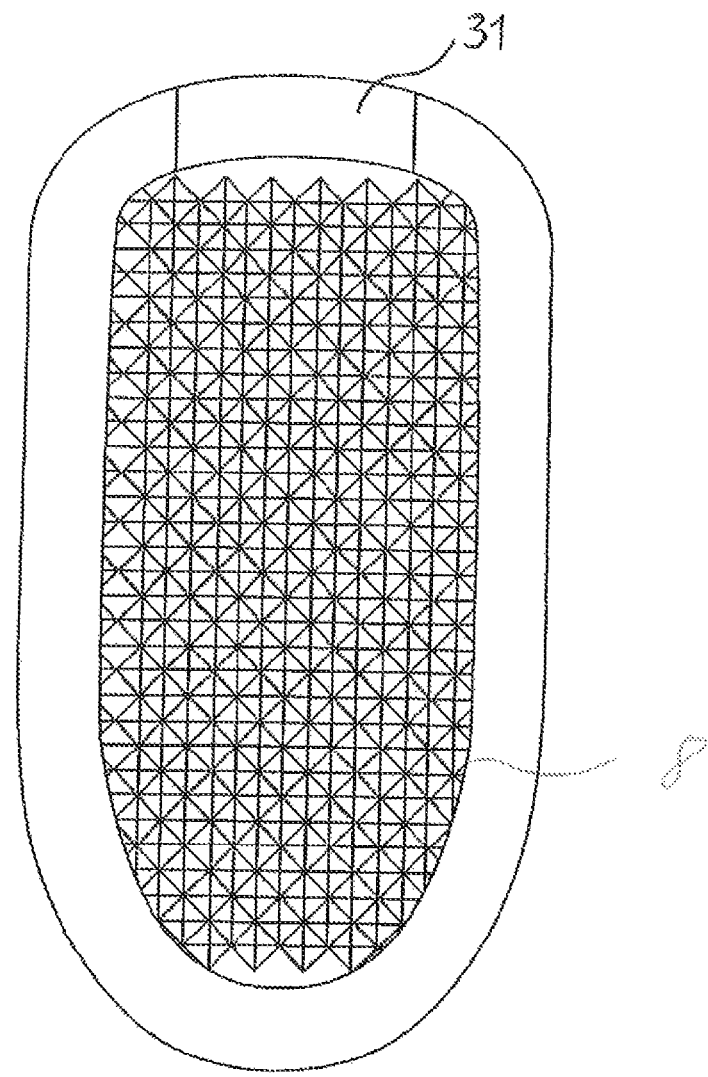

FIG. 7*a* shows, in a further enlarged representation, the underside of a bracket according to the invention with a three-dimensional meshed structure, and also the outlet channel 31 for adhesive.

As can be seen, the meshed structure consists essentially of rectilinear elevations and/or depressions which are formed at right angles or at 45° to one another and which thus form a very rough and enlarged surface and thus form a maximum contact surface area for the adhesive used.

Figure 7B:
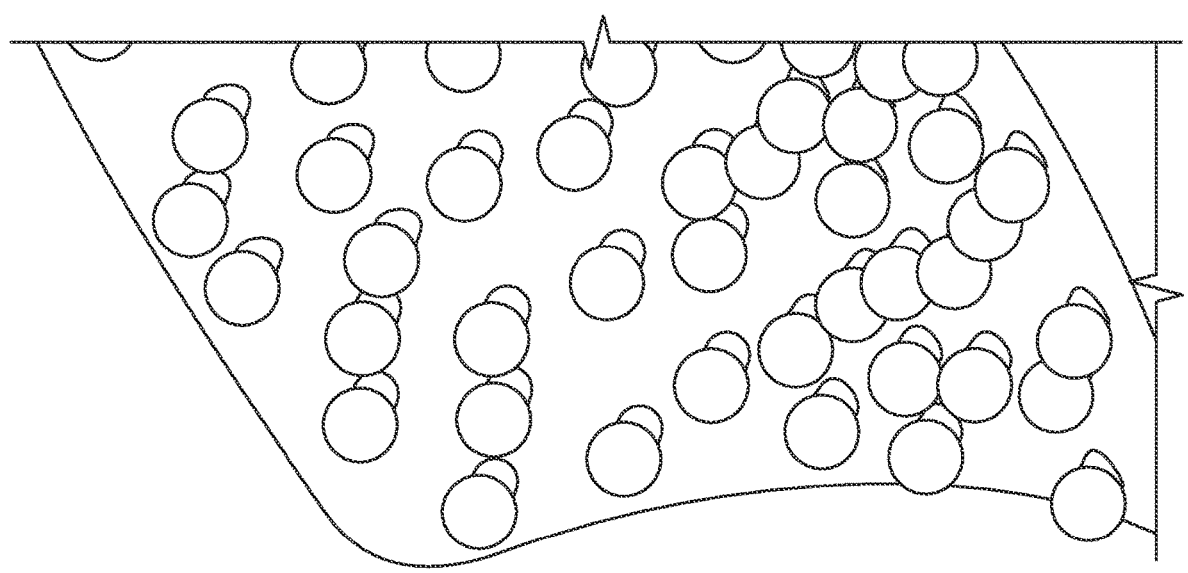

Instead of the meshed base according to FIG. 7*a*, an embodiment as shown in FIG. 7*b* is also alternatively advantageous according to the invention. FIG. 7*b* shows a detail from the base with a "mushroom structure" and, in such an embodiment, the base has a multiplicity, e.g. more than 100, of small bodies which are cylindrical, oval or of like cross section in the transition region to the base bottom and which then at their free end terminate with a roughly spherical (teardrop-shaped) body, such that the side view gives the impression of a small "cep", hence the term "mushroom base". The multiplicity of small bodies forming the mushroom base may be distributed evenly/symmetrically or unevenly/asymmetrically over the base surface. FIG. 7*b* shows an uneven/asymmetric distribution.

On the one hand, the advantage of the mushroom base can be related to production, while on the other hand such a mushroom base also has the advantage that it offers the applied adhesive an even larger surface area for attachment to the base of the bracket.

FIG. 8 shows three different views a), b) and c) of a molar bracket.

The shape is elliptic (convex) in the longitudinal direction and moreover arched like a tortoise shell in the sagittal and apical occlusal direction, in order to reduce irritation of the mucosa (or inner lip) or tongue. On the vestibular aspect there is a distally open wing-like cutout 33, which serves for suspension of elastic rubber chains and/or intermaxillary elastics, steel ligatures, lace backs, etc.

A furrow-shaped constriction 5 extends on the vestibular aspect in an annular shape to the bracket base and likewise serves for suspension of elastic chains and/or intermaxillary elastics or blocks.

As can be seen in FIG. 8*a*, the bracket has centrally in the longitudinal direction a continuous opening (tunnel) 39. This continuous opening runs in the mesiodistal direction, i.e. sagittal direction. Formed on the inner side of the opening, there are also for example webs 38 of substantially semicircular cross section. These webs are structurally configured in the same way as the webs 25 in the fourth slot channel and serve essentially to reduce friction, wherein the webs 38 are preferably formed on both sides of the opening 39, and in FIG. 8*d* the webs on the opposite sides of the opening channel 39 are arranged offset (but the webs 38 of the opening channel 39 can also be positioned lying opposite each other).

The bracket base is designed as has already been explained in the preceding figures (in particular FIGS. 4.6, 4.13 (see there "H" or 4.15), thus has a bevel of 105° degrees (as shown in an enlarged view in FIGS. 13 and 14) and likewise the already described adhesive outlet channel 31 for excess material, said adhesive outlet channel 31 being slightly offset to the center M in FIG. 8*a*.

Figure 9:
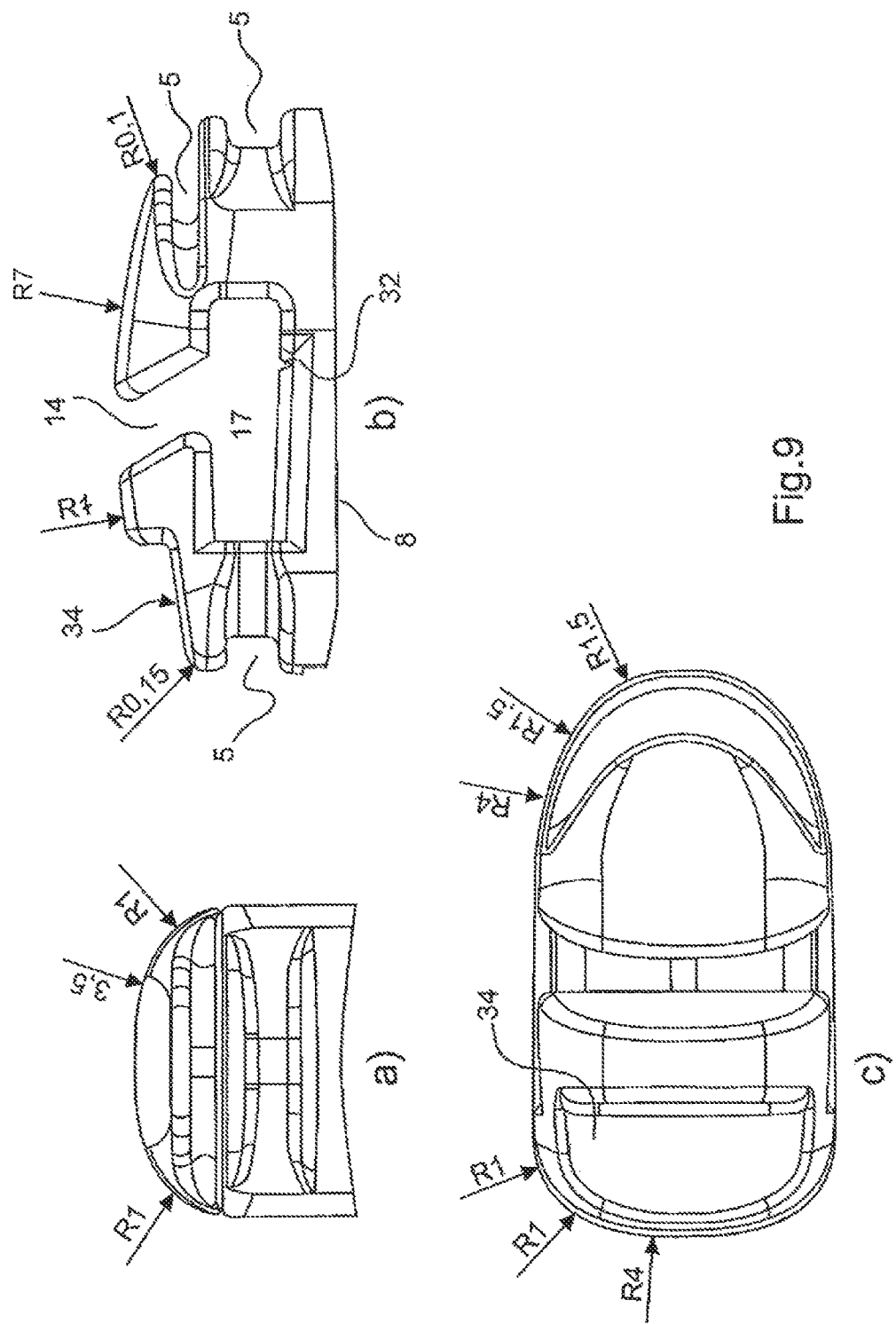

FIG. 9 shows three different views a, b and c of the anterior tooth bracket for the lower jaw.

The anterior tooth bracket shows a flatter bracket base (corresponding surface shape of an anterior tooth in the lower jaw region) corresponding to the small radius of the anterior teeth in the mesiodistal direction.

Again, a recess 31 is provided for excess adhesive material, and the meshed base provides more hold on account of the increased surface area.

The beveled, ramp-like formation 34 of the incisal portion of the bracket is advantageous in order to permit extensive jaw closure in the case of a maxillary front that is too steep and thereby to successively project the steep or retruded maxillary front simultaneously with jaw closure.

The bevel sloping down to the "pit" 17 (fourth slot portion) has the function of the first slot portion 14, serving in the initial part of the slot portion to hold the arch in the part of the snug fit in the bracket during "arch movement", and also in certain cases in the fourth slot portion 17 itself.

In the example shown in FIG. 9*b*, the first slot 14 tapers at an oblique angle to the fourth slot portion 17 (pit). However, a right-angled taper is also possible (although not shown).

The circumferential grooves 5, which are also formed as the constriction or notch, are intended to receive intermaxillary elastics, blocks, alastics, elastic chains, etc.

The illustrated notch 32 is a predetermined breaking point.

The shape of the apical half is in turn like a tortoise shell (outwardly curved with gentle transitions in the edge regions), which can also be designated as a convexity, in order to reduce irritation of the mucosa.

Shafts/web 25 mounted on both sides of the snug fit serve to reduce friction.

The pit apical to the snug fit (in the lower jaw) and occlusally (in the upper jaw) serves to receive the arch, insofar as the latter, for reasons relating to the tooth position, cannot be located in the slot channel 17 within the bracket system.

Figure 10:
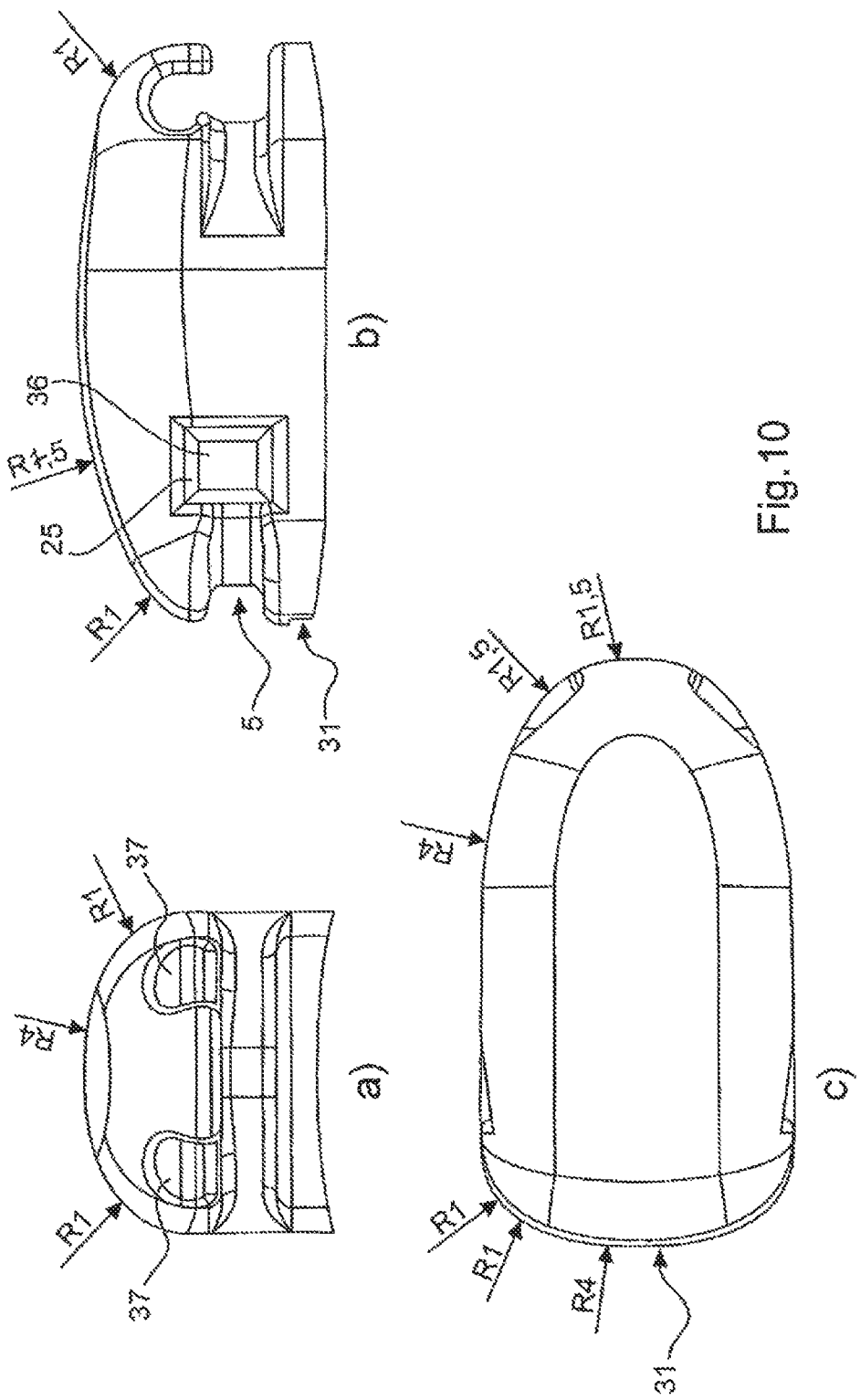

FIG. 10 shows in turn three views a (cross section), b (longitudinal section) and c (top view) of a canine tooth bracket.

The circumferential groove 5 and also the apical indent 35 are designed for intermaxillary elastics, blocks, alastics, elastic chains, etc.

The shafts/webs 25 in the tunnel 36 serve to reduce friction.

The vestibular surface is in turn like a tortoise shell, i.e. substantially convex, in order to reduce irritation of the mucous membrane.

The bracket base is designed, as in the illustrations already shown, with an adhesive outlet channel 31 for excess material.

FIG. 11 again shows three views a), b) and c) of a premolar bracket.

The slot guide has a first slot portion 14, a second slot portion 15, a third slot portion 16, and a fourth slot portion 17 (already described with reference to FIG. 4). The fourth slot portion 17 forms the snug fit for the inserted archwire (not shown) and, therefore, the bracket according to the invention as already described and also shown in FIG. 11 has no mechanical or movable parts.

The circumferential grooves/constrictions 5, 26 are provided to receive intermaxillary elastics, blocks, alastics, elastic chains, etc.

The notch 32 serves as a predetermined breaking point in the event that the bracket is to be removed from the tooth. Then, when the two parts shown in FIG. 11b to the left and right of the predetermined breaking point 32 are moved toward each other, the bracket breaks below the notch 32, and thus the bracket can then be easily detached from the tooth because the adhesive contact surface is divided into 2 parts.

The indent 35 located in the apical part serves for the suspension of chains, elastics or for the arch passage.

The webs (can also be referred to as shafts) 25 in the fourth slot portion (snug fit) serve to reduce friction.

Again, it can also be clearly seen from FIG. 11 that the vestibular surface of the bracket according to the invention is like a tortoise shell, i.e. substantially convex both in the longitudinal direction and in the transverse direction, in order to reduce or completely prevent irritation of the mucous membrane.

As already shown inter alia in FIG. 3b but also in FIGS. 4.7, 4.9 and others, the inlet region of the fourth slot portion has a lower base 19 which is slightly offset over the third slot portion and which forms a bottom plane 21, also referred to below as pit 40. This pit 40 can be seen clearly in FIG. 11b. This pit is oriented apically to the snug fit (in the lower jaw) and occlusally (in the upper jaw), which means that, when the bracket is placed on the tooth, the pit is preferably oriented in the direction of the gum. This pit 40 serves to receive the arch, insofar as the latter, for reasons relating to the position of the tooth, cannot be located in the narrowed region of the fourth slot portion within the bracket system and, with the formation of the pit, the arch is still held securely by the bracket and thus the fourth slot portion 17; at any rate, the pit 40 should prevent a situation in which the arch accidentally moves from the fourth slot portion 17 into the third slot portion 16, from which the arch is impeded by the wall and the edge 41 of the pit.

Figure 12:
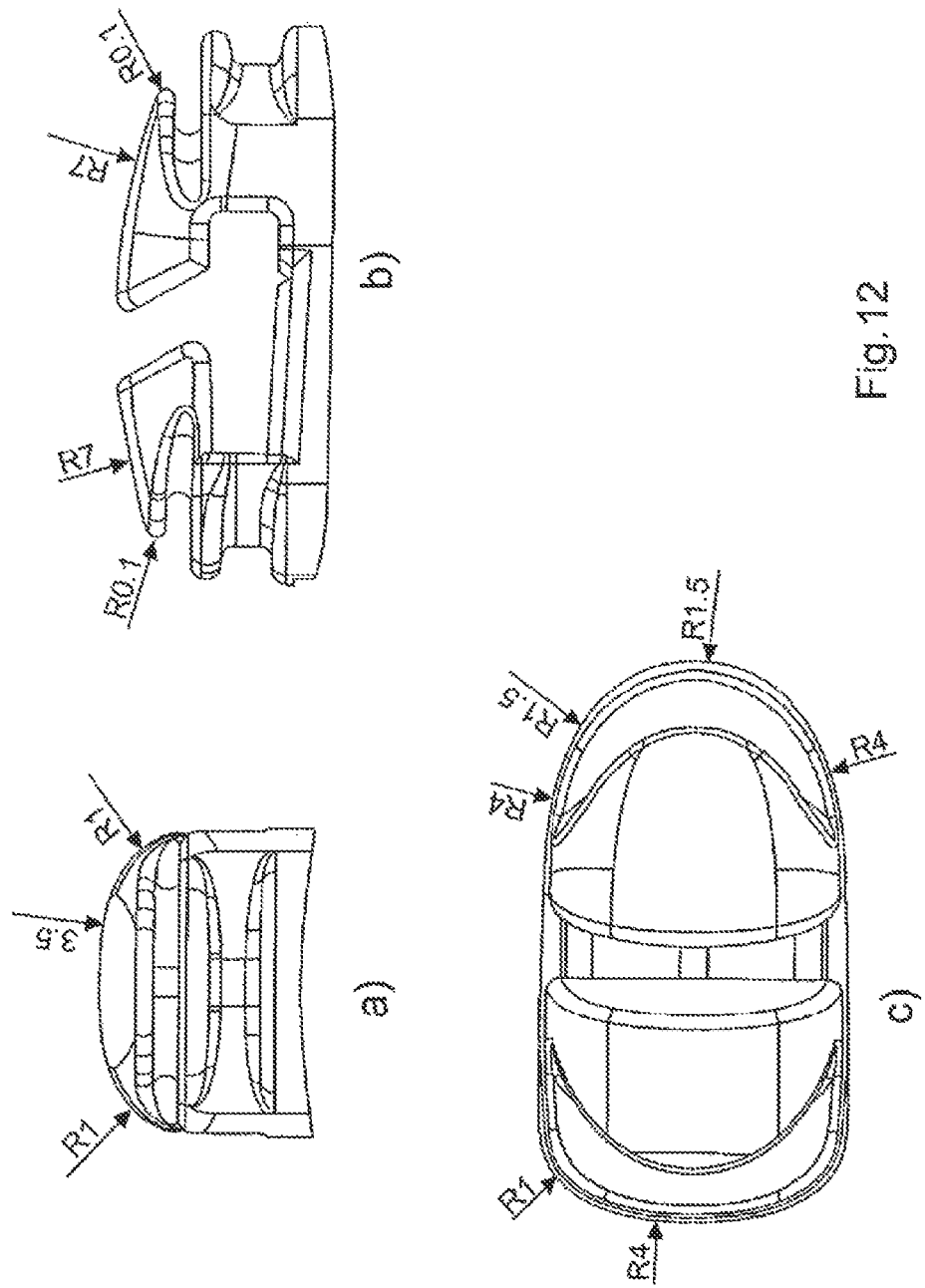

FIG. 12 shows three views a), b) and c) of an anterior tooth bracket for the upper jaw.

Here too, it can once again be clearly seen that the vestibular surface is like a tortoise shell, i.e. substantially convex in the longitudinal direction and in the transverse direction, in order to reduce irritation of the mucous membrane.

The radii illustrated in the figures on the top of the bracket or on the side represent an example and may well serve as a "best mode design".

However, it should be pointed out in general that deviations from the radii are readily possible, without departing from the scope of protection of the invention.

The radii indicated are therefore only given by way of example, in particular in order to describe the described tortoise shell structure of the vestibular surface of the bracket and the gently rounded curves thereof. As stated, by avoiding sharp edges of the vestibular surface of the bracket according to the invention, this is done to reduce or to completely avoid irritation of the tongue or of the inner aspect of the lip and thus the mucosa.

The invention includes not only a single bracket, but also a set of brackets, e.g. a set consisting of molar bracket, premolar bracket, anterior tooth bracket for lower and upper jaw, and canine tooth bracket.

The invention further includes not only a single such set, but also a set of brackets having different bracket sizes, such that the single bracket is also correspondingly adapted to the tooth size. It goes without saying that, for example, a large bracket does not fit a small tooth, but the respective bracket size must also be adapted to the tooth size.

Figure 13A:
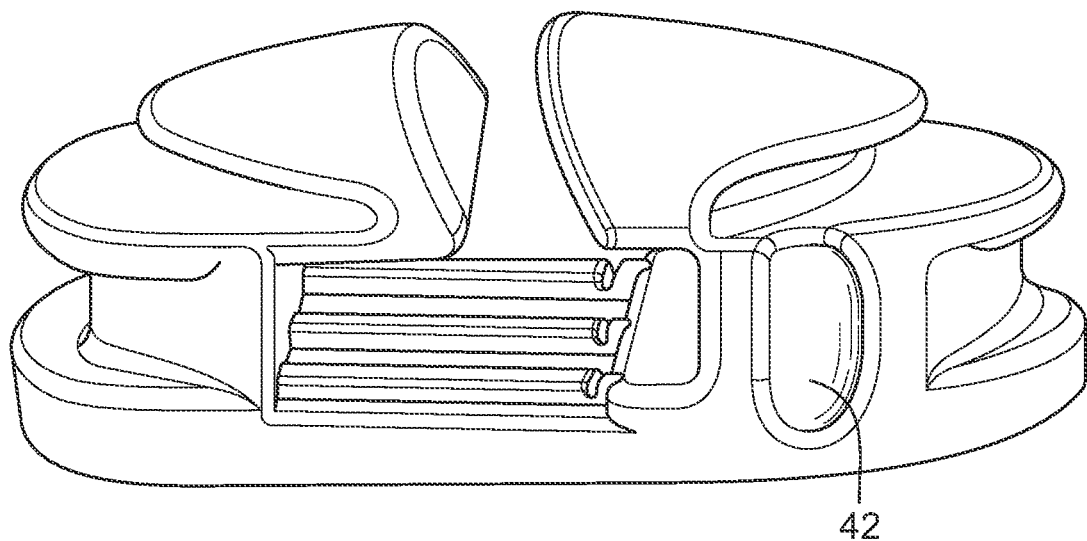
Figure 13B:
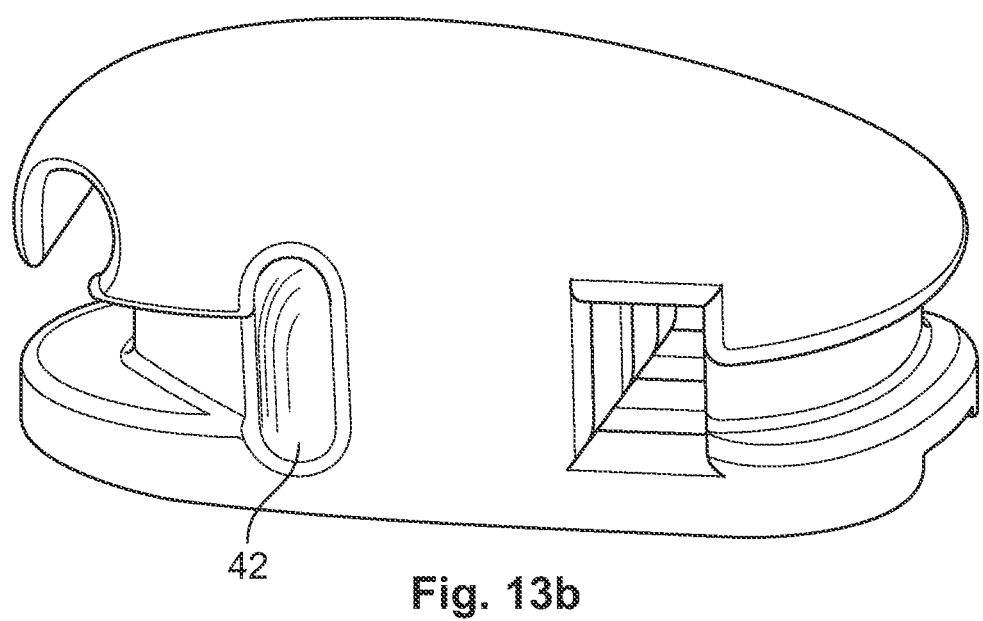

FIGS. 13a and 13b show two further views of a region of a described bracket shape; however, in the brackets shown, notches 42 are arranged on the respective opposite sides of the respective bracket. In the illustrated example according to FIGS. 13a and 13b, these are the premolar brackets. The notches 42 (which may also be referred to as indents) serve for suspension of intermaxillary elastics and/or rubber chains, for example in sagittal movement of the bracket due to gaps in the dental arch. The force vector thus moves closer to the center of resistance in the bone, which causes the tooth to tilt less.

FIG. 13b shows the channel 12 or aperture 6 already shown in some other illustrations. This channel, which may also be referred to as a molar tube, should have a width of at least aperture 0.2 mm and, as already described, its interior should have oppositely offset projections or webs 25 in order to achieve the best possible fixing of an archwire, thread or the like that is pulled through the channel.

LIST OF REFERENCE SIGNS 1 bracket
2 notches
3 curvature
4 zenith
5 constriction
6 aperture
7 opening
8 bracket bottom (bracket base)
9 notches/grooves
12 channel
13 slot
14 first slot portion
15 second slot portion
16 third slot portion
17 fourth slot portion
18 slot wall
18a/18b opposite walls of the slot 18
19 lower base of the slot portion 17
20 end of the slot portion 17

21 bottom plane
22 wall plane
23 widened opening of the first slot portion 14
24 bracket body
25 web in the fourth slot channel
26 circumferential constriction/notch
27 drawn-down bracket edge
28 recess for supporting an arch above the constriction 26
29 mesh structure of the bracket underside (facing toward the tooth)
30 curved underside (approximating to the natural tooth curvature)
31 outlet channel for adhesive
32 predetermined breaking point
33 wing-like cutout
34 beveled ramp
35 apical indent
36 tunnel
37 notches
38 webs
39 opening
40 pit
41 edge
42 notches

The invention claimed is:

1. A bracket for correcting the position of a tooth, comprising a bracket base of a bracket body, the bracket base can be fastened to a tooth, and the bracket body has a slot extending in a mesiodistal direction, the bracket has a first slot portion, a second slot portion, and a third slot portion, and the bracket has a fourth slot portion that narrows by a predetermined amount in a predetermined region, so as to form a snug fit for an inserted archwire, wherein the fourth slot portion is running in a longitudinal direction substantially parallel to the bracket base, the longitudinal direction being perpendicular to the mesiodistal direction,
wherein several straight web-like elevations running alongside one another in the longitudinal direction of the fourth slot channel are formed therein, the elevations ensuring that the archwire does not rest against the slot channel over the entire surface of the slot channel wall but only where the web-like elevations are located.

2. The bracket as claimed in claim 1, wherein the slot extending in the mesiodistal direction has a first slot portion for insertion of the archwire, wherein the first slot portion is adjoined by a second slot portion that extends substantially perpendicular thereto and which, in a direction of the bracket base that is parallel to the longitudinal direction, adjoins a third slot portion, wherein the third slot portion lies substantially parallel to the first slot portion, and the third slot portion is adjoined by the fourth slot portion, which is oriented substantially parallel to the second slot portion and thus perpendicular to the third slot portion.

3. The bracket as claimed in claim 1, wherein the fourth slot portion is longer than the first and/or second and/or third slot portion.

4. The bracket as claimed in claim 1, wherein the first and the third slot portions extend substantially in a direction towards the bracket base that is perpendicular to the mesiodistal direction and perpendicular to the longitudinal direction, while the second and the fourth slot portions extend substantially cervically, approximately parallel to the bracket base.

5. The bracket as claimed in claim 1, wherein the bracket has a circumferential constriction/notch.

6. The bracket as claimed in claim 1, wherein the bracket base is narrower than the cervical extent of the bracket, and a recess extending in the mesiodistal direction is provided above and/or below on the bracket body at the bracket base.

7. The bracket as claimed in claim 1, wherein the fourth slot portion has a base that lies below the base of the third slot portion.

8. The bracket as claimed in claim 1, wherein the fourth slot portion has an end that lies opposite the slot portion base and that lies above the upper side of the first slot portion.

9. The bracket as claimed in claim 1, wherein the bracket base has a bottom surface surrounded by a circumferential edge which, at a certain location of the edge, has an aperture serving as an outlet channel for adhesive.

10. The bracket as claimed in claim 1, wherein the bracket body is composed of a first part and a second part, which are produced together and between which a predetermined breaking point is formed.

11. The bracket as claimed in claim 1, wherein an upper side of the bracket body in the longitudinal direction and/or transverse direction in cross section lies substantially on a circular line.

12. The bracket as claimed in claim 1, wherein the bracket base substantially in the transverse direction has a curved underside, which approximates to the natural tooth curvature.

13. The bracket as claimed in claim 1, wherein the bracket has a constriction that either extends approximately parallel to the bracket bottom or lies at an angle thereto of 5-10°.

14. A set of brackets as claimed in claim 1, wherein the brackets have different dimensions.

15. A bracket for correcting the position of a tooth, comprising a bracket base on a bracket body, which bracket base can be fastened to a tooth, and the bracket body has a slot extending in a mesiodistal direction, the bracket has a first slot portion, a second slot portion, and a third slot portion, and the bracket has a fourth slot portion that has two opposite slot walls, wherein the opposite slot walls do not lie parallel and instead enclose an angle of 2° to 8°, wherein the fourth slot portion is running in a longitudinal direction substantially parallel to the bracket base, the longitudinal direction being perpendicular to the mesiodistal direction,
wherein several straight web-like elevations running alongside one another in the longitudinal direction of the fourth slot channel are formed therein, the elevations ensuring that the archwire does not rest against the slot channel over the entire surface of the slot channel wall but only where the web-like elevations are located.

16. The bracket as claimed in claim 15, wherein at least one of the two slot walls of the fourth slot portion has at least one ridge extending in the longitudinal direction of the fourth slot portion, preferably a plurality of ridges, on which the archwire can come to rest.

17. A bracket as claimed in claim 15, wherein a vestibular surface of the bracket is like a tortoise shell, free of sharp edges and has a substantially convex surface in the longitudinal direction and in the transverse direction and is configured to reduce irritation of the mucous membrane, and the bracket is composed of a single part and has no mechanically movable parts.

18. The bracket as claimed in claim 17, wherein the bracket, at its upper side, has no sharp edges, and has rounded curves that have a radius in the range of r 0.1 to r 10.

* * * * *